United States Patent
Ikeda et al.

(10) Patent No.: US 10,903,724 B2
(45) Date of Patent: Jan. 26, 2021

(54) ROTATION ANGLE DETECTOR AND ROTARY ELECTRIC MACHINE

(71) Applicant: Mitsubishi Electric Corporation, Tokyo (JP)

(72) Inventors: Hiroko Ikeda, Tokyo (JP); Yusuke Morita, Tokyo (JP); Kazumasa Ito, Tokyo (JP); Yu Hirotani, Tokyo (JP); Kodai Okazaki, Tokyo (JP); Satoru Akutsu, Tokyo (JP); Yuji Takizawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 93 days.

(21) Appl. No.: 15/779,164

(22) PCT Filed: Dec. 28, 2015

(86) PCT No.: PCT/JP2015/086503
§ 371 (c)(1),
(2) Date: May 25, 2018

(87) PCT Pub. No.: WO2017/115414
PCT Pub. Date: Jul. 6, 2017

(65) Prior Publication Data
US 2018/0351437 A1   Dec. 6, 2018

(51) Int. Cl.
*H02K 11/225*   (2016.01)
*G01D 5/20*   (2006.01)
(Continued)

(52) U.S. Cl.
CPC ........... *H02K 11/225* (2016.01); *G01D 5/20* (2013.01); *G01D 5/2046* (2013.01); *H02K 1/146* (2013.01); *H02K 1/24* (2013.01)

(58) Field of Classification Search
CPC ...... H02K 11/225; H02K 11/21; H02K 29/06; H02K 29/08; H02K 29/12; H02K 29/14;
(Continued)

(56) References Cited

U.S. PATENT DOCUMENTS

| 8,947,075 B2 | 2/2015 | Tsuge et al. |
| 2011/0074400 A1 | 3/2011 | Nakano et al. |

(Continued)

FOREIGN PATENT DOCUMENTS

| CN | 102047079 A | 5/2011 |
| JP | 2013-44679 A | 3/2013 |

(Continued)

OTHER PUBLICATIONS

Sakai Masahiro, Detection Method and Device of disconnection of redundant type VR Synchro, Oct. 22, 2015, JP 2015184249 (English Machine Translation) (Year: 2015).*

(Continued)

*Primary Examiner* — Quyen P Leung
*Assistant Examiner* — Alexander A Singh
(74) *Attorney, Agent, or Firm* — Sughrue Mion, PLLC; Richard C. Turner

(57) ABSTRACT

The present invention provides a rotation angle detector capable of detecting a rotation angle of a rotor in the same manner as at normal time even when abnormality such as disconnection or a short circuit occurs, and capable of reducing the number of terminals. When one spatial order cycle of the output winding is an electrical angle of 360°, a phase difference between a first output winding and a second output winding and a phase difference between the second output winding and a third output winding are set at an electrical angle $\alpha$, and $\alpha \neq 180° \times n$ (n is an integer).

10 Claims, 20 Drawing Sheets

(51) Int. Cl.
*H02K 1/14* (2006.01)
*H02K 1/24* (2006.01)

(58) Field of Classification Search
CPC .......... H02K 1/24; H02K 1/146; H02K 24/00;
H02K 3/28; G01D 5/20; G01D 5/2046;
G01P 3/46
USPC .......... 310/12.19, 68 B; 324/207.25, 207.17,
324/207.18
See application file for complete search history.

(56) References Cited

U.S. PATENT DOCUMENTS

| | | | | |
|---|---|---|---|---|
| 2013/0009631 A1* | 1/2013 | Tsuge | ................... | G01D 5/2046 |
| | | | | 324/207.18 |
| 2013/0060518 A1* | 3/2013 | Nakazato | ............. | G01D 5/2073 |
| | | | | 702/151 |

FOREIGN PATENT DOCUMENTS

| | | |
|---|---|---|
| JP | 2013-221740 A | 10/2013 |
| JP | 2013-247828 A | 12/2013 |
| JP | 2015-184249 A | 10/2015 |

OTHER PUBLICATIONS

Communication dated Jun. 26, 2019, from the European Patent Office in counterpart application No. 15912080.7.
International Search Report for PCT/JP2015/086503, dated Mar. 22, 2016.
Communication dated Nov. 20, 2019, from The State Intellectual Property Office of the P.R. of China in counterpart Application No. 201580085379.3.

* cited by examiner

Fig. 15

| TOOTH NUMBER | SEQUENCE OF WINDINGS | | | | | | | | | | | |
|---|---|---|---|---|---|---|---|---|---|---|---|---|
| | T1 | T2 | T3 | T4 | T5 | T6 | T7 | T8 | T9 | T10 | T11 | T12 |
| FIRST EXCITATION WINDING | 1 | 5 | 2 | 4 | 3 | 3 | 4 | 2 | 5 | 1 | 1 | 5 |
| SECOND EXCITATION WINDING | 2 | 4 | 3 | 3 | 4 | 2 | 5 | 1 | 1 | 5 | 2 | 4 |
| FIRST OUTPUT WINDING | 3 | 3 | 4 | 2 | 5 | 1 | 1 | 5 | 2 | 4 | 3 | 3 |
| SECOND OUTPUT WINDING | 4 | 2 | 5 | 1 | 1 | 5 | 2 | 4 | 3 | 3 | 4 | 2 |
| THIRD OUTPUT WINDING | 5 | 1 | 1 | 5 | 2 | 4 | 3 | 3 | 4 | 2 | 5 | 1 |

Fig. 20

| PLACE DISCONNECTED | FIRST OUTPUT WINDING Sa | SECOND OUTPUT WINDING Sb | THIRD OUTPUT WINDING Sc | NEUTRAL POINT TERMINAL D |
|---|---|---|---|---|
| θ CALCULATING METHOD 1 | Vsb | Vsc | Vsa | Vsa−Vsb |
|  | Vsc | Vsa | Vsb | Vsb−Vsc |
| θ CALCULATING METHOD 2 | Vsc | Vsa | Vsb | Vsb−Vsc |
|  | Vsb−Vsc | Vsc−Vsa | Vsa−Vsb | Vsc−Vsa |
| θ CALCULATING METHOD 3 | Vsb−Vsc | Vsc−Vsa | Vsa−Vsb | Vsc−Vsa |
|  | Vsb | Vsc | Vsa | Vsa−Vsb |

Fig. 21

| TERMINAL | Ra+ | Ra− | Rb+ | Rb− | Sa+ | Sb+ | D |
|---|---|---|---|---|---|---|---|
| Ra+ | | SHORT-CIRCUIT CASE 1 | SHORT-CIRCUIT CASE 2 | SHORT-CIRCUIT CASE 3 | SHORT-CIRCUIT CASE 4 | SHORT-CIRCUIT CASE 5 | SHORT-CIRCUIT CASE 6 |
| Ra− | | | SHORT-CIRCUIT CASE 7 | SHORT-CIRCUIT CASE 8 | SHORT-CIRCUIT CASE 9 | SHORT-CIRCUIT CASE 10 | SHORT-CIRCUIT CASE 11 |
| Rb+ | | | | SHORT-CIRCUIT CASE 12 | SHORT-CIRCUIT CASE 13 | SHORT-CIRCUIT CASE 14 | SHORT-CIRCUIT CASE 15 |
| Rb− | | | | | SHORT-CIRCUIT CASE 16 | SHORT-CIRCUIT CASE 17 | SHORT-CIRCUIT CASE 18 |
| Sa+ | | | | | | SHORT-CIRCUIT CASE 19 | SHORT-CIRCUIT CASE 20 |
| Sb+ | | | | | | | SHORT-CIRCUIT CASE 21 |
| D | | | | | | | |

Fig. 22

| VOLTAGE USED FOR CALCULATING ROTATION ANGLE θ OF ROTOR | | Vsb | Vsc | Vsb-Vsc | Vsc | Vsa | Vsc-Vsa | Vsb | Vsa | Vsa-Vsb | Vsb-Vsc | Vsc-Vsa | |
|---|---|---|---|---|---|---|---|---|---|---|---|---|---|
| SHORT-CIRCUIT CASE NUMBER | SHORT-CIRCUIT TERMINAL | Vsc | Vsb-Vsc | Vsb | Vsa | Vsc-Vsa | Vsc | Vsa-Vsb | Vsa | Vsb-Vsc | Vsc-Vsa | Vsa-Vsb | MINIMUM VALUE |
| | NO SHORT CIRCUIT | 1 | 2 | 3 | 4 | 5 | 6 | 7 | 8 | 9 | 10 | 11 | 12 | |
| 1 | Ra− | 1.0 | 1.0 | 1.0 | 1.7 | 1.7 | 1.7 | 0.9 | 0.9 | 0.9 | 0.7 | 0.7 | 0.7 | 0.7 |
| 2 | Ra+ | 1.0 | 1.0 | 1.0 | 1.7 | 1.7 | 1.7 | 0.9 | 0.9 | 0.9 | 0.7 | 0.7 | 0.7 | 0.7 |
| 3 | Ra+ | Rb− | 1.0 | 1.0 | 1.0 | 1.7 | 1.7 | 1.7 | 0.9 | 0.9 | 0.9 | 0.7 | 0.7 | 0.7 | 0.7 |
| 4 | Ra+ | Sa+ | 1.0 | 1.0 | 1.0 | 1.7 | 1.7 | 1.7 | 0.9 | 0.9 | 0.9 | 0.7 | 0.7 | 0.7 | 0.7 |
| 5 | Ra+ | Sb+ | 1.0 | 1.0 | 1.0 | 1.7 | 1.7 | 1.7 | 0.9 | 0.9 | 0.9 | 0.7 | 0.7 | 0.7 | 0.7 |
| 6 | Ra+ | D | 1.0 | 1.0 | 1.0 | 1.7 | 1.7 | 1.7 | 0.9 | 0.9 | 0.9 | 0.7 | 0.7 | 0.7 | 0.7 |
| 7 | Ra− | Rb+ | 1.0 | 1.0 | 1.0 | 1.7 | 1.7 | 1.7 | 0.9 | 0.9 | 0.9 | 0.7 | 0.7 | 0.7 | 0.7 |
| 8 | Ra− | Rb− | 1.0 | 1.0 | 1.0 | 1.7 | 1.7 | 1.7 | 0.9 | 0.9 | 0.9 | 0.7 | 0.7 | 0.7 | 0.7 |
| 9 | Ra− | Sa+ | 1.0 | 1.0 | 1.0 | 1.7 | 1.7 | 1.7 | 0.9 | 0.9 | 0.9 | 0.7 | 0.7 | 0.7 | 0.7 |
| 10 | Ra− | Sb+ | 1.0 | 1.0 | 1.0 | 1.7 | 1.7 | 1.7 | 0.9 | 0.9 | 0.9 | 0.7 | 0.7 | 0.7 | 0.7 |
| 11 | Ra− | D | 1.0 | 1.0 | 1.0 | 1.7 | 1.7 | 1.7 | 0.9 | 0.9 | 0.9 | 0.7 | 0.7 | 0.7 | 0.7 |
| 12 | Rb+ | Rb− | 1.0 | 1.0 | 1.0 | 1.7 | 1.7 | 1.7 | 0.9 | 0.9 | 0.9 | 0.7 | 0.7 | 0.7 | 0.7 |
| 13 | Rb+ | Sa+ | 1.0 | 1.0 | 1.0 | 1.7 | 1.7 | 1.7 | 0.9 | 0.9 | 0.9 | 0.7 | 0.7 | 0.7 | 0.7 |
| 14 | Rb+ | Sb+ | 1.0 | 1.0 | 1.0 | 1.7 | 1.7 | 1.7 | 0.9 | 0.9 | 0.9 | 0.7 | 0.7 | 0.7 | 0.7 |
| 15 | Rb+ | D | 1.0 | 1.0 | 1.0 | 1.7 | 1.7 | 1.7 | 0.9 | 0.9 | 0.9 | 0.7 | 0.7 | 0.7 | 0.7 |
| 16 | Rb− | Sa+ | 1.0 | 1.0 | 1.0 | 1.7 | 1.7 | 1.7 | 0.9 | 0.9 | 0.9 | 0.7 | 0.7 | 0.7 | 0.7 |
| 17 | Rb− | Sb+ | 1.0 | 1.0 | 1.0 | 1.7 | 1.7 | 1.7 | 0.9 | 0.9 | 0.9 | 0.7 | 0.7 | 0.7 | 0.7 |
| 18 | Rb− | D | 1.0 | 1.0 | 1.0 | 1.7 | 1.7 | 1.7 | 0.9 | 0.9 | 0.9 | 0.7 | 0.7 | 0.7 | 0.7 |
| 19 | Sa+ | Sb+ | 2421.2 | 2421.2 | 2421.2 | 2525.5 | 2525.5 | 2525.5 | 2552.1 | 2552.1 | 2552.1 | 2499.5 | 2499.5 | 2499.5 | 2421.2 |
| 20 | Sa+ | D | 245.9 | 245.9 | 245.9 | 2795.8 | 2795.8 | 2795.8 | 3102.0 | 3102.0 | 3102.0 | 908.1 | 908.1 | 908.1 | 245.9 |
| 21 | Sb+ | D | 4705.9 | 4705.9 | 4705.9 | 244.7 | 244.7 | 244.7 | 4817.3 | 4817.3 | 4817.3 | 910.8 | 910.8 | 910.8 | 244.7 |

ROTATION ANGLE DETECTOR AND ROTARY ELECTRIC MACHINE

CROSS REFERENCE TO RELATED APPLICATIONS

This application is a National Stage of International Application No. PCT/JP2015/086503 filed Dec. 28, 2015.

TECHNICAL FIELD

The present invention relates to a rotation angle detector configured to detect a rotation angle of a rotor by using a change in permeance in a gap between the rotor and a stator, and a rotary electric machine using the rotation angle detector.

BACKGROUND ART

There has been known a rotation angle detector in which three output windings are wound around each of a plurality of teeth provided in a stator, with a phase difference between each of the teeth set at an electrical angle of 120°, and one end of each of the three output windings is electrically connected another end of each thereof is electrically connected to an output terminal (see, for example, Patent Literature 1 and Patent Literature 2).

There has also been known a rotation angle detector in which output windings are made up of a first system winding and a second system winding, each of the first system winding and the second system winding is wound around teeth of the stator by one-skip or two-skips, and only any one of the system windings is wound around one tooth (see, for example, Patent Literature 3).

CITATION LIST

Patent Literature

[PTL 1] JP 2013-44679 A
[PTL 2] JP 2013-221740 A
[PTL 3] JP 2013-247828 A

Non Patent Literature

[NPL 1] "Theory and Characteristics on Novel Variable Reluctance IX Resolver", Akira Ishizaki, et al., IEEJ (the Institute of Electrical Engineers of Japan) Transactions on Industry Applications Vol. 115, No. 5 (1995), p. 598-604

SUMMARY OF INVENTION

Technical Problem

However, the related arts have problems as follows. In Patent Literatures 1 and 2, the rotation angle of the rotor required to be calculated based on output signals from the respective three output windings. Thus, redundancy is not formed though abnormality such as disconnection or a short circuit of the output winding can be detected, and at the occurrence of the abnormality, the rotation angle cannot be detected in the same manner as at normal time, which has been problematic.

In Patent Literature 3, although the redundancy is structured because the stator windings are formed of the first system winding and the second system winding made up of an excitation winding and two-phase output windings, the number of terminals is six at a lead-out position of each system winding and twelve in total, to make the wiring complex and unsuitable for size reduction, which has also been problematic.

The present invention has been made for solving the problems as described above, and it is an object of the present invention to obtain a rotation angle detector that can detect a rotation angle of a rotor in the same manner as at normal time even when abnormality such as disconnection or a short circuit occurs, and can reduce the number of terminals.

According to one embodiment of the present invention, there is provided a rotation angle detector including: a rotor, which has $N_x$ salient poles; a stator, in which teeth Ti to Tm are circumferentially arranged, where m is a natural number; a first excitation winding Rai (i=1 to m), which is mounted on an i-th tooth Ti of the stator; a second excitation winding Rbi (i=1 to m), which is mounted on the i-th tooth Ti of the stator; a first output winding Sai (i=1 to m), which is mounted on the i-th tooth Ti of the stator; a second output winding Sbi (i=1 to m), which is mounted on the i-th tooth Ti of the stator; a third output winding Sci (i=1 to m), which is mounted on the i-th tooth Ti of the stator; a first excitation circuit and a second excitation circuit, which respectively are configured to apply AC voltages to the first excitation winding Ra1 to Ram and the second excitation windings Rb1 to Rbm which are connected in series; and an angle calculator, which is configured to calculate a rotation angle of the rotor from output voltages of the first output windings Sa1 to Sam, the second output windings Sb1 to Sbm, and the third output windings Sc1 to Scm, in which, when one spatial order cycle of the output winding is an electrical angle of 360°, a phase difference of an electrical angle α is provided between the first output winding and the second output winding, and between the second output winding and the third output winding, and α≠180°×n (n is an integer).

Advantageous Effects of Invention

According to the rotation angle detector of the present invention, when one spatial order cycle of the output winding is an electrical angle of 360°, a phase difference between a first output winding and a second output winding and a phase difference between the second output winding and a third output winding are set at an electrical angle α, and α≠180°×n (n is an integer).

Therefore, it is possible to detect the rotation angle of the rotor in the same manner as at normal time even when abnormality such as disconnection or a short circuit occurs, and to reduce the number of terminals.

BRIEF DESCRIPTION OF DRAWINGS

FIG. 15 is an explanatory table for showing a relationship between a sequence to wind the windings and each tooth number in the resolver of the rotation angle detector according to the fourth embodiment of the present invention.

FIG. 20 is an explanatory table for showing combination of output voltages required for calculation of a rotation angle of a rotor in the resolver of the rotation angle detector according to the fifth embodiment of the present invention.

FIG. 21 is an explanatory table for showing short circuits that can occur between terminals provided in an extended part of the resolver of the rotation angle detector according to the fifth embodiment of the present invention.

FIG. 22 is an explanatory table for showing angle errors at the time of calculating a rotation angle of the rotor by twelve methods in a case where a short circuit occurs between the terminals in the resolver of the rotation angle detector according to the fifth embodiment of the present invention.

DESCRIPTION OF EMBODIMENTS

A description is now given of a rotation angle detector and a rotary electric machine using the rotation angle detector according to preferred embodiments of the present invention referring to the accompanying drawings, and throughout the drawings, like or corresponding components are denoted by like reference symbols to describe those components. The present invention is not limited to the description below, and modifications can be made thereto as appropriate within the range not departing from the gist of the present invention.

First Embodiment

Figure 1:
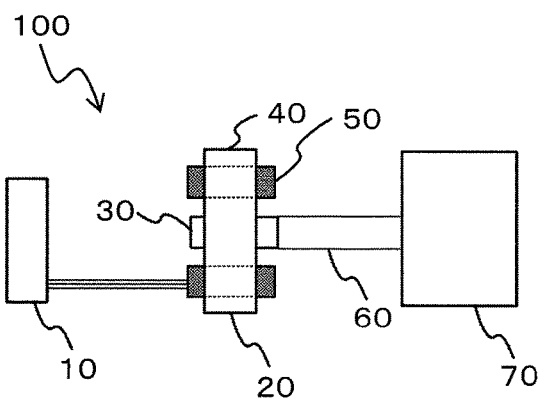
FIG. 1 is a configuration view for illustrating a rotation angle detector according to a first embodiment of the present invention.

FIG. 1 is a configuration view for illustrating a rotation angle detector according to a first embodiment of the present invention. In FIG. 1, a rotation angle detector 100 is made up of an angle calculator 10 and a resolver 20. The resolver 20 includes a rotor 30, a stator 40, and a coil 50. The rotor 30 is connected to a rotary electric machine 70 and rotary parts of a variety of devices via a shaft 60.

Figure 2:
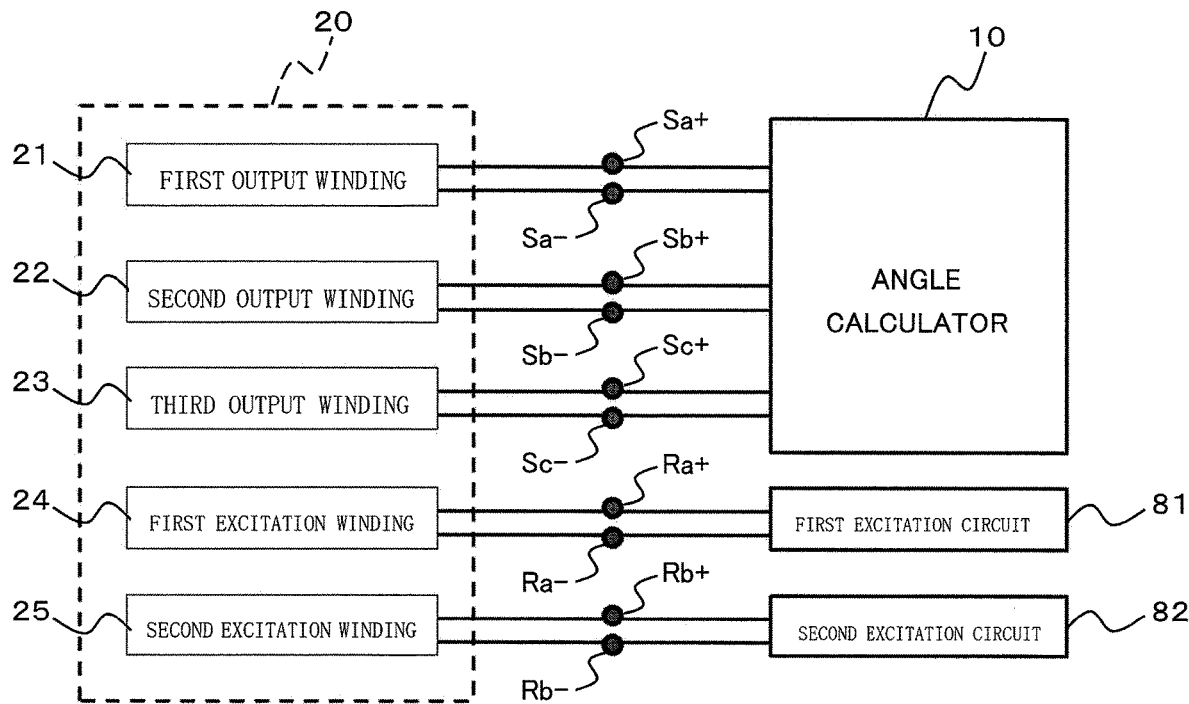
FIG. 2 is a block diagram for illustrating the rotation angle detector according to the first embodiment of the present invention.

FIG. 2 is a block diagram for illustrating the rotation angle detector according to the first embodiment of the present invention. In FIG. 2, the resolver 20 includes a first output winding 21, a second output winding 22, a third output winding 23, a first excitation winding 24, and a second excitation winding 25 which are the coil 50 wound around each tooth of the stator 40.

The first output winding 21, the second output winding 22, and the third output winding 23 are connected to the angle calculator 10 via positive terminals Sa+, Sb+, and Sc+, and negative terminals Sa−, Sb−, and Sc−, respectively. The angle calculator 10 calculates a rotation angle of the rotor 30 from output voltages generated in the three-phase output windings of the resolver 20, and outputs the calculated rotation angle.

The first excitation winding 24 and the second excitation winding 25 are connected to a first excitation circuit 81 and a second excitation circuit 82 via positive terminals Ra+ and Rb+, and negative terminals Ra− and Rb−, respectively. The first excitation circuit 81 and the second excitation circuit 82 apply AC voltages to the first excitation winding 24 and the second excitation winding 25, respectively.

Figure 3:
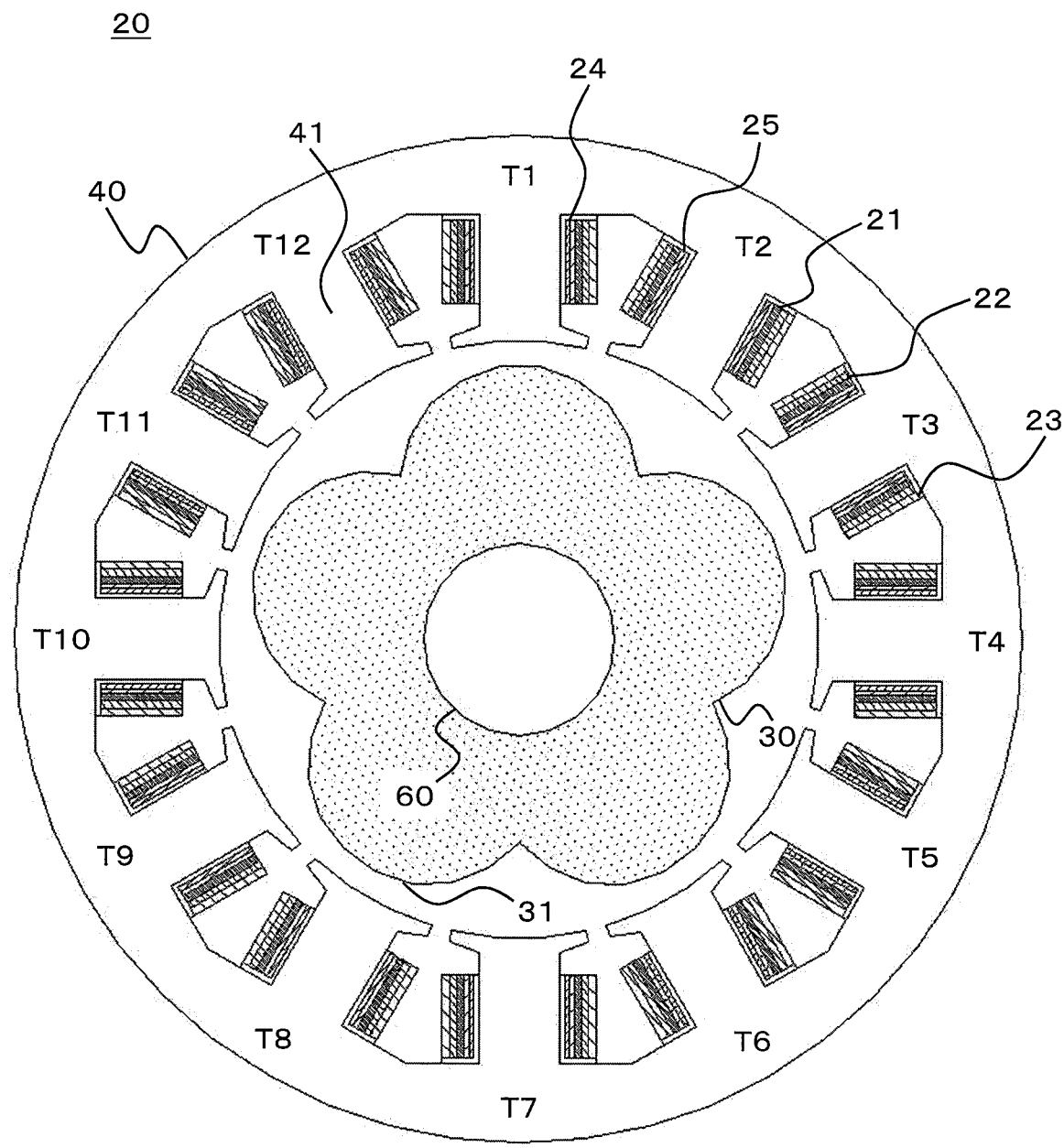
FIG. 3 is a sectional view for illustrating a resolver of the rotation angle detector according to the first embodiment of the present invention.

FIG. 3 is a sectional view for illustrating the resolver of the rotation angle detector according to the first embodiment of the present invention. In FIG. 3, the number $N_s$ of teeth 41 of the stator 40 according to the first embodiment of the present invention is 12, and the number $N_x$ of salient poles 31 of the rotor 30 is 5. The number of salient poles 31 is also called an axis double angle.

The two-phase excitation windings 24 and 25, and the three-phase output windings 21 to 23 are wound around each of teeth T1 to T12 of the stator 40. A description is given in the first embodiment of the present invention assuming that the number $N_s$ of teeth 41 is 12 and the number $N_x$ of salient poles 31 is 5, but these numbers are not limited to the above, and a similar effect can be obtained with numbers other than these numbers.

Figure 4:
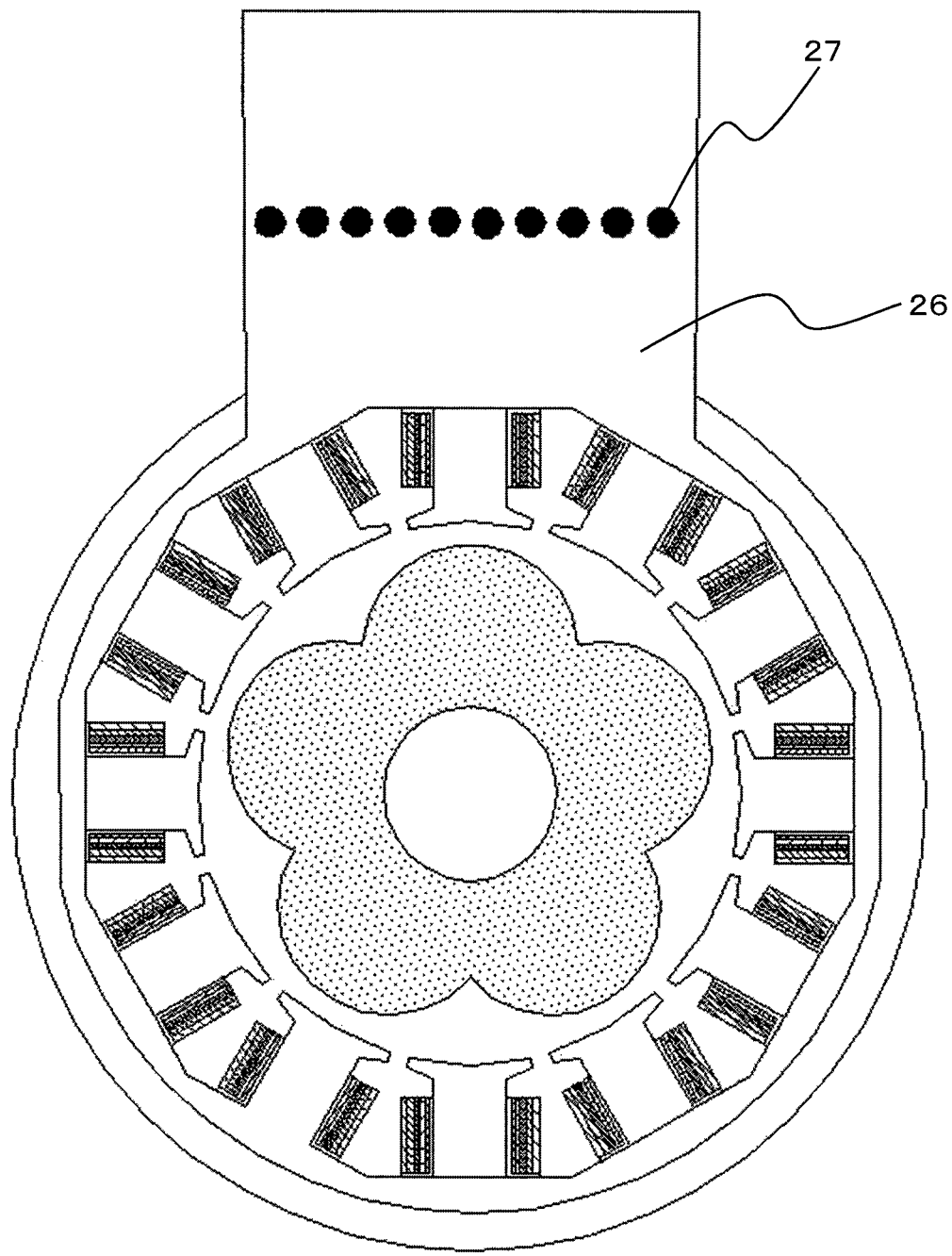
FIG. 4 is a front view for illustrating the resolver of the rotation angle detector according to the first embodiment of the present invention.
Figure 5:
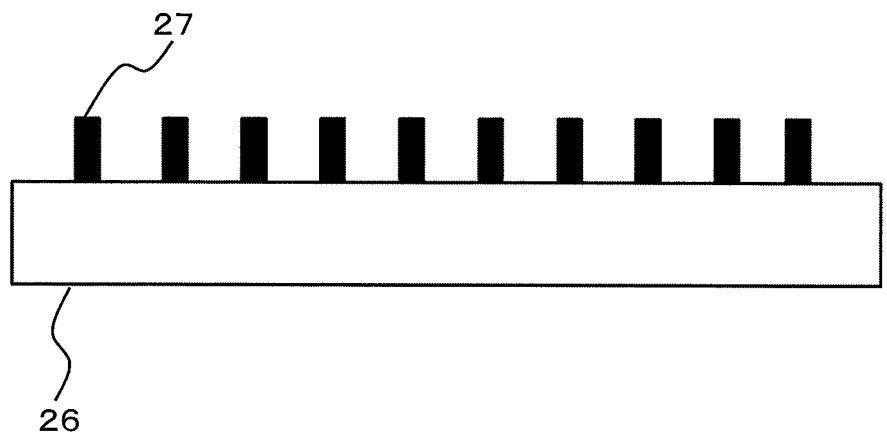
FIG. 5 is a sectional view for illustrating an extended part of the resolver of the rotation angle detector according to the first embodiment of the present invention.

FIG. 4 is a front view for illustrating the resolver of the rotation angle detector according to the first embodiment of the present invention. FIG. 5 is a sectional view for illustrating an extended part of the resolver of the rotation angle detector according to the first embodiment of the present invention.

In FIG. 4 and FIG. 5, the first output winding 21, the second output winding 22, the third output winding 23, the first excitation winding 24, and the second excitation winding 25 are respectively connected to the angle calculator 10, the first excitation circuit 81, and the second excitation circuit 82 via terminals 27 made up of the positive terminals Sa+, Sb+, Sc+, Ra+, and Rb+ and the negative terminals Sa−, Sb−, Sc−, Ra−, and Rb− which are provided in an extended part 26 of the resolver 20.

When two resolvers are used for redundancy or when two-system windings made up of an excitation winding and two-phase output windings are wound around one resolver, the number of terminals is 12, whereas the number of terminals can be set to ten in the first embodiment of the present invention. Thus, it is possible to facilitate wiring between the terminal 27 and the angle calculator 10 and achieve downsizing.

Further, the resolver 20 illustrated in FIG. 3 has a configuration in which the two-phase excitation windings 24 and 25 are wound around the tooth 41 first, and then the three-phase output windings 21 to 23 are wound thereon. At this time, any one of the first excitation winding 24 and the second excitation winding 25 may be wound first, and the first output winding 21, the second output winding 22, and the third output winding 23 may be wound in any sequence.

Further, the first output winding 21, the second output winding 22, the third output winding 23, the first excitation winding 24, and the second excitation winding 25 are all wound in series around each of the teeth T1 to T12. There are cases where the resolver 20 is provided with a tooth 41 around which any one-phase winding out of the three-phase output windings 21 to 23 is not wound. The winding and the tooth 41 are insulated from each other with an insulator made of insulation paper, coating, or the like. The windings of the respective phases are insulated from each other with insulation paper or the like.

In the first embodiment of the present invention, with the three-phase output windings 21 to 23 circumferentially arranged and wound, the respective distances from a gap between the stator 40 and the rotor 30 to the first output winding 21, the second output winding 22, and the third output winding 23 are equal to one another. Thus, magnetic fluxes interlinked to the respective output windings are equal, that is, amplitudes of output signals are equal, thereby enabling improvement in detection accuracy.

Figure 6:
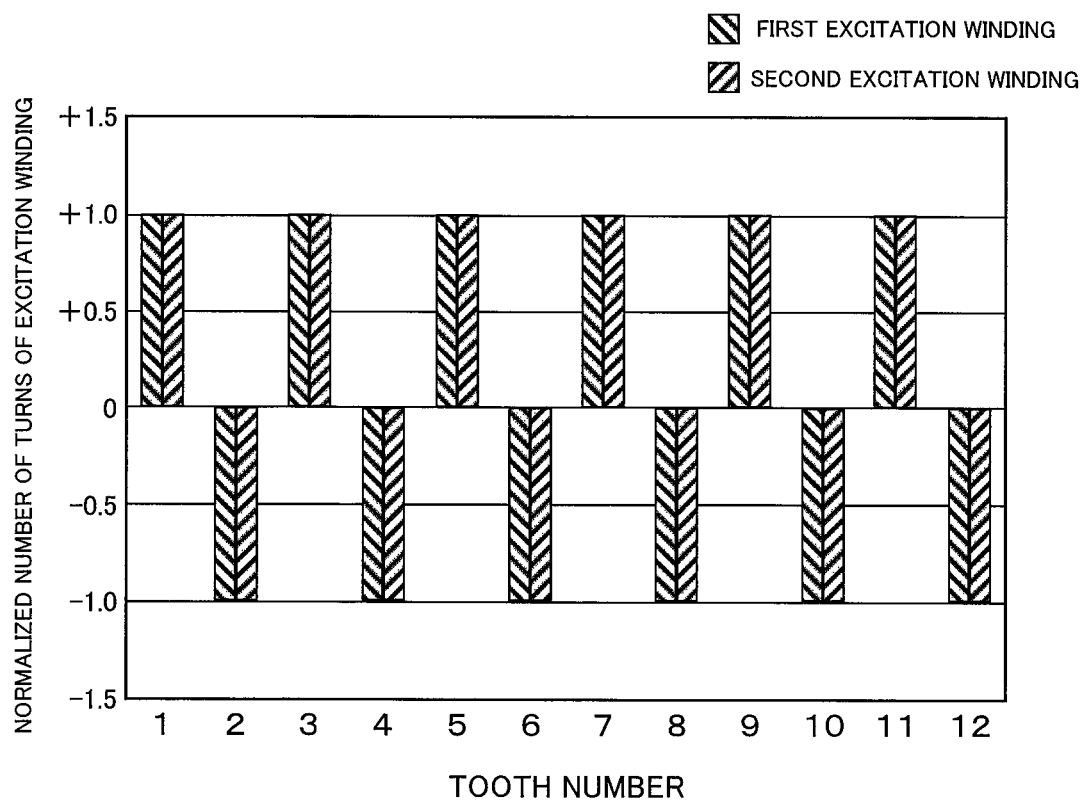
FIG. 6 is an explanatory graph for showing a relationship between the numbers of turns of first and second excitation windings and each tooth number in the resolver of the rotation angle detector according to the first embodiment of the present invention.

FIG. 6 is an explanatory graph for showing the relationship between the numbers of turns of the first and second excitation windings and each tooth number in the resolver of the rotation angle detector according to the first embodiment of the present invention. FIG. 6 is a graph for showing a winding distribution of the excitation windings. The number of turns of the excitation winding is normalized by the amplitude of the number of turns. In FIG. 6, a winding direction (+) and a winding direction (−) are defined in the excitation winding of the resolver 20.

When the direction of the winding of some coil is expressed as a winding direction (+), a coil with its winding wound reversely is expressed as a winding direction (−). Further, absolute values of the number of turns in the winding direction (+) and the number of turns in the winding direction (−) are the same. That is, when the number of turns in the winding direction (+) is +X, the number of turns in the winding direction (−) is −X.

In the first embodiment of the present invention, the excitation winding is repeatedly wound around the stator, by units of two teeth of (+) and (−), $N_e$ times. At this time, the number $N_e$ of pole pairs in any of the first excitation winding 24 and the second excitation winding 25 is 6 (=$N_s/2$).

Figure 7:
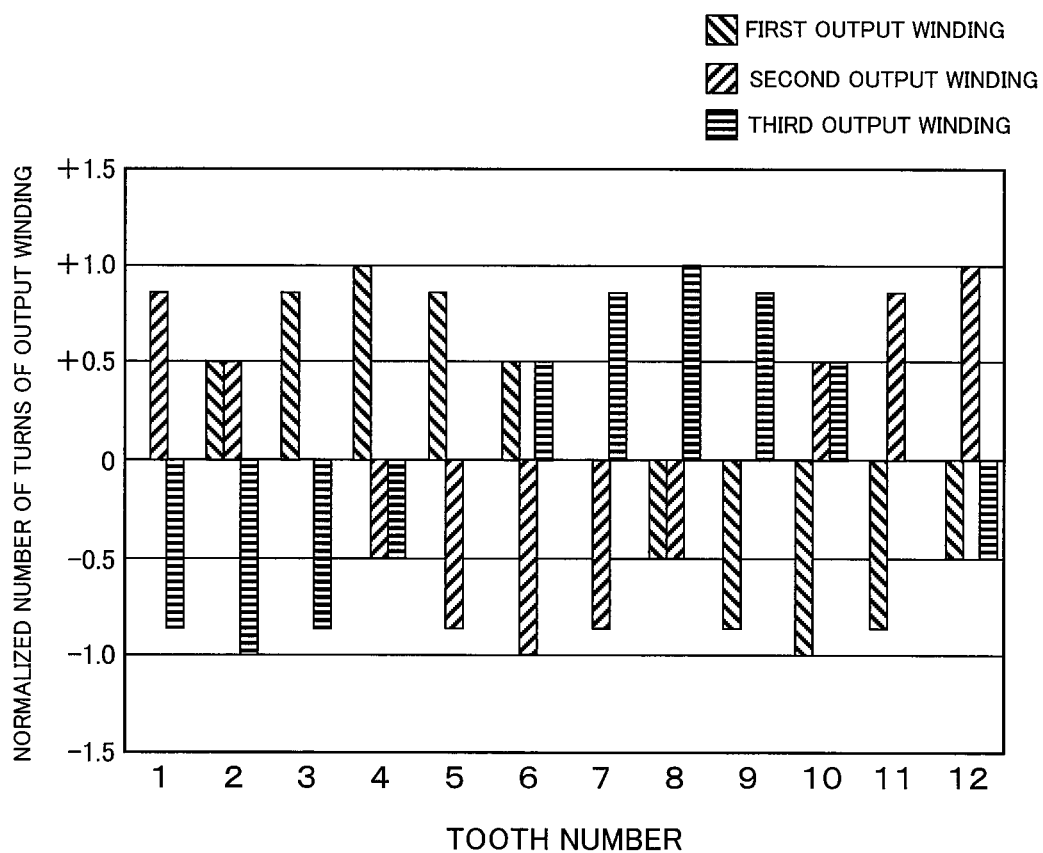
FIG. 7 is an explanatory graph for showing a relationship between the numbers of turns of first, second, and third output windings and each tooth number in the resolver of the rotation angle detector according to the first embodiment of the present invention.

FIG. 7 is an explanatory graph for showing the relationship between the numbers of turns of the first, second, and third output windings and each tooth number in the resolver of the rotation angle detector according to the first embodiment of the present invention. FIG. 7 is a graph for showing a winding distribution of the output windings. The number of turns of the output winding is normalized by the amplitude of the number of turns, namely, $N_1$ described later.

In FIG. 7, three-phase (A-phase, B-phase, C-phase) output windings are wound around the tooth 41 of the stator 40. Here, the numbers of turns ($N_{Sai}$, $N_{Sbi}$, $N_{Sci}$) of the output windings (A-phase, B-phase, C-phase) around an i-th tooth 41 are expressed by Expression (1).

Mathematical Expression (1)

$$N_{Sai} = N_1 \sin\left\{(N_e \pm N_x)\frac{1}{N_s}2(i-1)\pi + \theta_{teeth} + \alpha\right\}$$

$$N_{Sbi} = N_1 \sin\left\{(N_e \pm N_x)\frac{1}{N_s}2(i-1)\pi + \theta_{teeth}\right\}$$

$$N_{Sci} = N_1 \sin\left\{(N_e \pm N_x)\frac{1}{N_s}2(i-1)\pi + \theta_{teeth} - \alpha\right\}$$

In Expression (1), N represents the amplitude of the number of turns of the output winding, and $\theta_{teeth}$ represents the circumferential position of the tooth 41. The output winding is distributed in a sine-wave shape in the circumferential direction of the tooth 41. When the number of turns is a decimal, the number is round off to an integer. Thus, the numbers of turns ($N_{Sai}$, $N_{Sbi}$, $N_{Sci}$) of the output windings (A-phase, B-phase, C-phase) around the i-th tooth 41 vary dependent on phase differences of the three-phase output windings 21 to 23.

When the first excitation windings 24 mounted on teeth Ti (i=1 to $N_s$) are represented as Rai, the first excitation windings Rai are connected in series in a sequence of 1 to $N_s$. Similarly, when the second excitation windings 25 mounted on the teeth Ti (i=1 to $N_s$) are represented as Rbi, the second excitation windings Rbi are connected in series in a sequence of 1 to $N_s$.

When the first excitation windings 21 mounted on teeth Ti (i=1 to $N_s$) are represented as Sai, the first output windings Sai are connected in series in a sequence of 1 to $N_s$. Similarly, when the second output windings 22 mounted on the teeth Ti (i=1 to $N_s$) are represented as Sbi, the second output windings Sbi are connected in series in a sequence of 1 to $N_s$. Similarly, when the third output windings 23 mounted on the teeth Ti (i=1 to $N_s$) are represented as Sci, the third output windings Sci are connected in series in a sequence of 1 to $N_s$.

It is assumed here that the windings are connected in series in the sequence of 1 to $N_s$, but a similar effect can be obtained even when the tooth 41 at the beginning of the turn is an arbitrary tooth Ti and the adjacent teeth 41 are sequentially connected in series.

Subsequently, when the number of pole pairs of the excitation winding is set to $N_e$, and the number of salient poles 31 of the rotor 30 is set to $N_x$, magnetomotive force is a spatial $N_e$-th order and permeance in the gap is an $N_x$-th order. A spatial A-th order here means a component of an A cycle within a mechanical angle of 360°. The number $N_e$ of pole pairs is the number of pair of magnetic poles of the stator 40.

Through an AC excitation current flowing through the excitation winding of the resolver 20, a magnetic flux is generated in the gap, and is interlinked to the output winding to generate a voltage in the output winding. When the position of the rotor 30 changes, the permeance in the gap changes to cause a voltage change in the output winding.

At this time, the angle detection is performed from an envelope curve of a voltage generated in each of the two-phase output windings out of the output windings wound around each tooth 41. This envelope curve is called an output voltage. A magnetic flux density of the gap can be expressed by the product of the magnetomotive force and the permeance in the gap. With both the magnetomotive force and the permeance being trigonometric functions, the magnetic flux density of the gap is the degree of the trigonometric function of the above product.

That is, a spatial order (A) of the magnetic flux density of the gap is $|N_e \pm N_x|$, which is obtained from an expression for a sum of the products of the trigonometric functions. $|A|$ here represents an absolute value of A. When the spatial order of the magnetic flux density of this gap matches the spatial order of the output winding, an interlinkage flux of the output winding is generated due to orthogonality of the trigonometric function. At this time, the excitation current is AC, and hence a voltage is generated in the output winding and the angle can be detected.

As described above, in order to function as the rotation angle detector, it is necessary to pick up a magnetic flux with a spatial order equal to $|N_e \pm N_x|$ out of magnetic fluxes generated in the gap. This matter is described in "<2.1> Theory, p. 599" of Non Patent Literature 1, for example. Further, from Expression (7) of Non Patent Literature 1, a change made by a rotation angle φ is equal to $|N_e \pm N_x|$.

That is, in the resolver 20 according to the first embodiment of the present invention, the spatial order of the magnetic flux density of the gap, which is required for the angle detection, is "|6±5|=first order, eleventh order." Here, the relationship of "|1±$N_s$|=eleventh order" holds between the first order and the eleventh order being the spatial orders of the magnetic flux density of the gap, and it can thus be said that the first order and the eleventh order of the magnetic flux density of the gap are equivalent.

That is, for detecting the rotation angle of the rotor 30, the output winding requires to pick up one of the spatial first order and the spatial eleventh order, and here, the rotation angle of the rotor 30 is detected with the spatial order of the output winding taken as the first order.

In the first embodiment of the present invention, the resolver 20 includes two-phase excitation windings having the same amplitude and configuration, so that the resolver 20 can be excited even when abnormality such as disconnection or a short circuit occurs in any one of the first excitation winding 24 and the second excitation winding 25, with the result that the rotation angle of the rotor 30 can thus be detected in the same manner as at normal time.

Further, in the output winding of the resolver 20 in the first embodiment of the present invention, first output windings Sa1 to Sa12, second output windings Sb1 to Sb12, and third output windings Sc1 to Sc12 are disposed with a phase difference set to a when one spatial order cycle of the output winding is an electrical angle of 360°.

The angle calculator 10 calculates the rotation angle of the rotor 30 from output voltages $V_{Sa}$, $V_{Sb}$, and $V_{Sc}$ generated in the three-phase output windings 21 to 23, and outputs the calculated rotation angle. At this time, the output voltages $V_{Sa}$, $V_{Sb}$, and $V_{Sc}$ are expressed by Expressions (2) to (4), using the number (axis double angle) $N_x$ of the salient poles 31 of the rotor 30.

$V_{Sa} = k \cdot E \sin(N_x \cdot \theta + \alpha)$  Mathematical Expression (2)

$V_{Sb} = k \cdot E \sin(N_x \cdot \theta)$  Mathematical Expression (3)

$V_{Sc} = k \cdot E \sin(N_x \cdot \theta - \alpha)$  Mathematical Expression (4)

In Expressions (2) to (4), E represents an amplitude of an excitation voltage, k represents a voltage transformation ratio, θ represents a rotation angle of the rotor, α represents an electrical angle phase difference between the first output winding 21 and the second output winding 22 and between the second output winding 22 and the third output winding 23. However, "α≠180°×n (n is an integer)" is satisfied.

Subsequently, from Expressions (2) and (3), Expression (5) below holds with the rotation angle θ of the rotor 30, the axis double angle $N_x$ of the rotor, and the electrical angle phase difference α between each of the first output winding 21, the second output winding 22, and the third output winding 23.

Mathematical Expression (5)

$$\cos(N_x \cdot \theta) = \frac{\sin(N_x \cdot \theta + \alpha) - \sin(N_x \cdot \theta) \cdot \cos(\alpha)}{\sin(\alpha)}$$

Similarly, from Expressions (3) and (4), Expression (6) below holds with the rotation angle θ of the rotor 30, the axis double angle $N_x$ of the rotor, and the electrical angle phase difference α between each of the first output winding 21, the second output winding 22, and the third output winding 23.

Mathematical Expression (6)

$$\cos(N_x \cdot \theta) = \frac{-\sin(N_x \cdot \theta - \alpha) + \sin(N_x \cdot \theta) \cdot \cos(\alpha)}{\sin(\alpha)}$$

Similarly, from Expressions (2) and (4), Expression (7) below holds with the rotation angle θ of the rotor 30, the axis double angle $N_x$ of the rotor, and the electrical angle phase difference α between each of the first output winding 21, the second output winding 22, and the third output winding 23.

Mathematical Expression (7)

$$\cos(N_x \cdot \theta) = \frac{\sin(N_x \cdot \theta + \alpha) - \sin(N_x \cdot \theta - \alpha)}{2 \cdot \sin(\alpha)}$$

Next, three output signals are obtained from the three-phase output windings 21 to 23 by Expressions (2) to (7), and from two output signals out of those, the rotation angle θ of the rotor 30 and the like can be obtained by the following expression.

$$\arctan\left(\frac{\sin}{\cos}\right)$$

That is, in the first embodiment of the present invention, the three-phase output windings 21 to 23 are disposed while setting the electrical angle phase difference α, so that the rotation angle θ of the rotor 30 can be detected by remaining two-phase output windings in the same manner as at normal time even when abnormality such as disconnection or a short circuit occurs in any one phase out of the three-phase output windings 21 to 23.

Here, the maximum value and the minimum value of a total number of turns $N_{Si}$ are $N_{Smax}$ and $N_{Smin}$, respectively, the total number of turns $N_{Si}$ being a total of the numbers of turns ($N_{Sai}$, $N_{Sbi}$, $N_{Sci}$) (i=1 to $N_s$) of the output windings (A-phase, B-phase, C-phase) around the i-th tooth 41.

Figure 8:
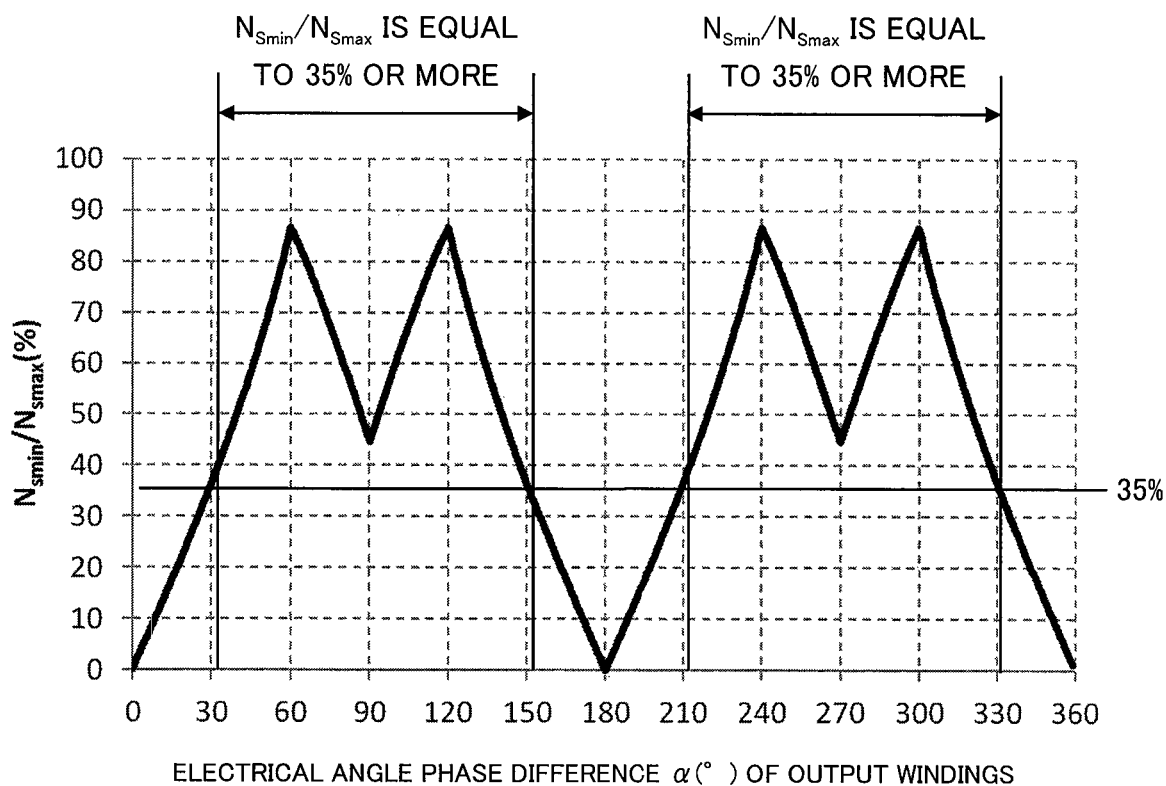
FIG. 8 is an explanatory graph for showing a relationship between a ratio of the maximum value and the minimum value of the number of turns of the output winding, which is wound around the teeth of the resolver of the rotation angle detector according to the first embodiment of the present invention, and an electrical angle phase difference of the output winding.

FIG. 8 is an explanatory graph for showing the relationship between a ratio of the maximum value and the minimum value of the number of turns of the output winding, which is wound around the tooth of the resolver of the rotation angle detector according to the first embodiment of the present invention, and the electrical angle phase difference of the output winding. FIG. 8 is a graph for showing a fluctuation of $N_{Smin}/N_{Smax}$ with respect to the electrical angle phase difference of the three-phase output windings 21 to 23.

In FIG. 8, when "30°+180°×n≤α≤150°+180°×n (n is an integer)" is set, $N_{Smin}/N_{Smax}$ is equal to about 35% or more. Therefore, in the first embodiment of the present invention, through determination of the electrical angle phase difference α so as to satisfy "30°+180°×n≤α≤150°+180°×n (n is an integer)", $N_{Smin}/N_{Smax}$ is set to equal to about 35% or more and the rotation angle θ of the rotor 30 can thus be detected without any practical problem.

Meanwhile, at the point when "α=180°×n" is satisfied, there exists a tooth 41 in which "$N_{Smin}/N_{Smax}$=0" is satisfied, that is, "$N_{Smin}$=0" is satisfied, and around which any of the output windings (A-phase, B-phase, C-phase) is not wound. Thus, the rotation angle θ of the rotor 30 cannot be detected, and the resolver 20 is not possible.

Figure 9:
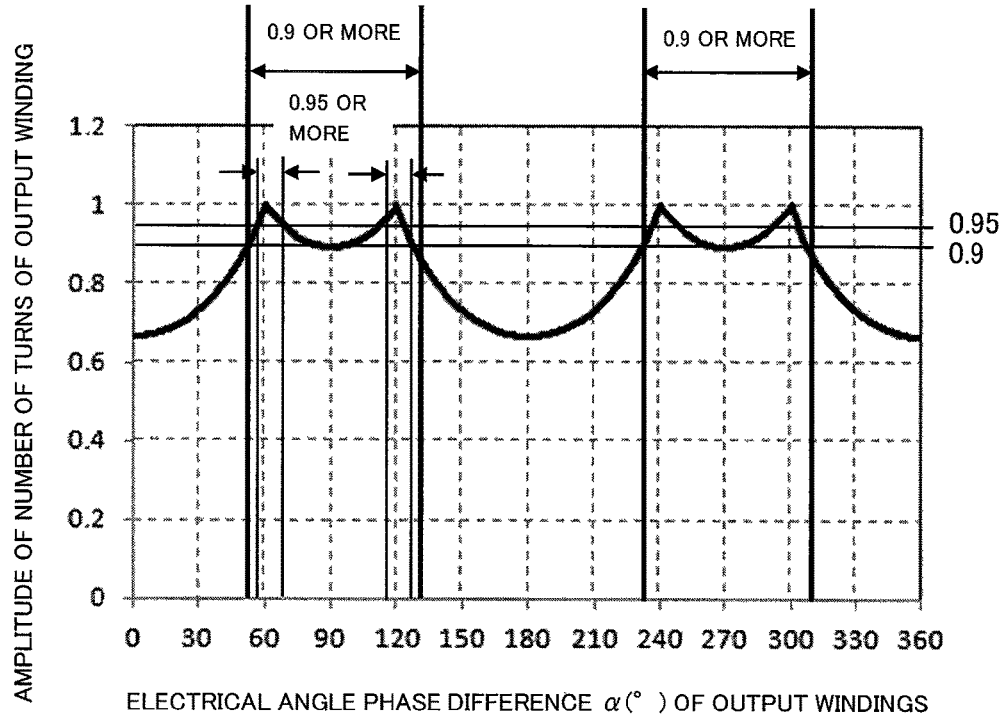
FIG. 9 is an explanatory graph for showing a relationship between a circumferential position of a stator and an amplitude of the number of turns of the output winding wound around one tooth of the resolver of the rotation angle detector according to the first embodiment of the present invention in the case of fixing the number of turns of the output winding.

FIG. 9 is an explanatory graph for showing the relationship between the circumferential position of the stator and the amplitude of the number of turns of the output winding wound around one tooth of the resolver of the rotation angle detector according to the first embodiment of the present invention in the case of fixing the number of turns of the output winding.

FIG. 9 is a graph for showing the amplitude of the number of turns of the output winding in the case of fixing the maximum value of the total number of turns of the three-phase output windings 21 to 23 wound around each one tooth, that is, $N_1$ in Expression (1) above when the horizontal axis represents the electrical angle phase difference of the three-phase output windings 21 to 23. The vertical axis is normalized by the value of the electrical angle phase difference α=120° of the three-phase output windings 21 to 23.

In FIG. 9, when "50°+180°×n≤α≤130°+180°×n (n is an integer)" is satisfied, the amplitude of the total number of turns of the output windings (A-phase, B-phase, C-phase) with respect to the maximum number of turns possible around one tooth is equal to about 0.9 or more. Thus, even when there is noise from a coil end or the like, the SN ratio can be improved to reduce an influence by the noise.

More preferably, "α=60°+180°×n" and "120°+180°×n" are satisfied to maximize the amplitude of the number of turns of the output windings, to thereby minimize the influence by noise. Even when "60°±5°+180°×n" and "120°±5°+180°×n" are satisfied, the amplitude of the total number of turns of the output windings (A-phase, B-phase, C-phase) with respect to the maximum number of turns possible around one tooth is equal to about 0.9 or more, which is not practically problematic.

Figure 10:
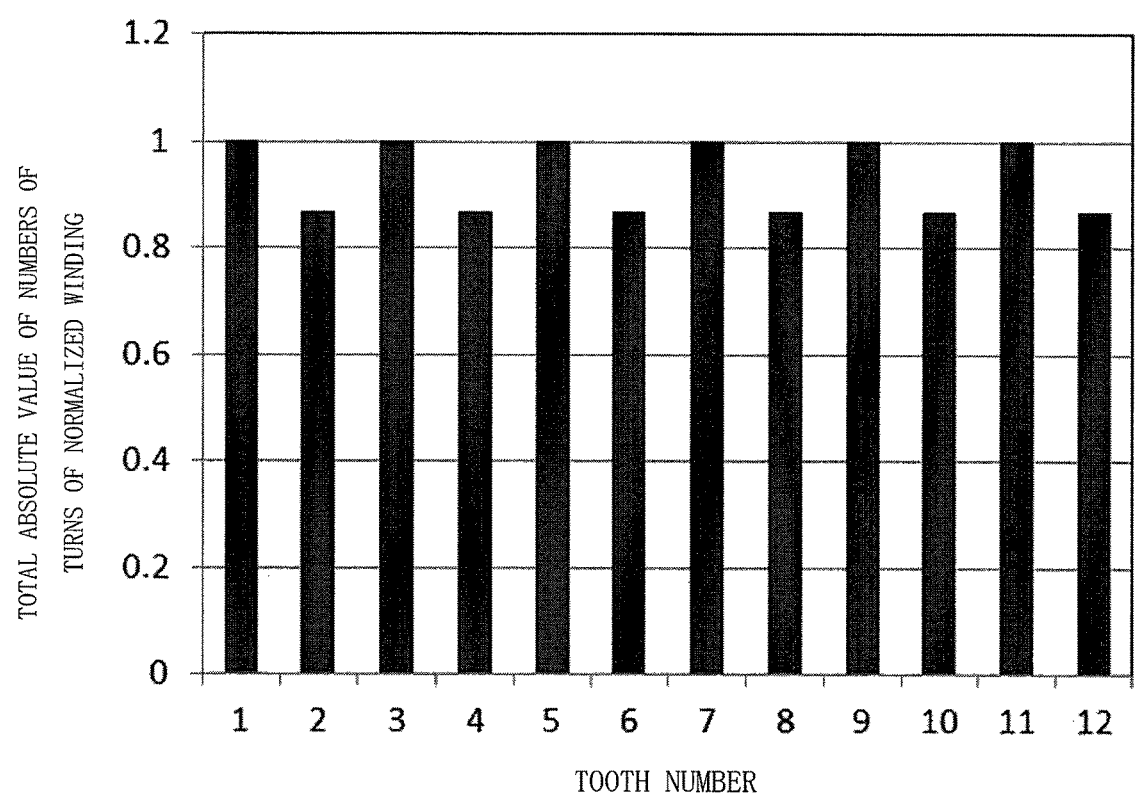
FIG. 10 is an explanatory graph for showing a relationship between a circumferential position of a stator and a total number of turns of the output windings in the resolver of the rotation angle detector according to the first embodiment of the present invention.

FIG. 10 is an explanatory graph for showing the relationship between the circumferential position of the stator and a total number of turns of the output windings in the resolver of the rotation angle detector according to the first embodiment of the present invention. FIG. 10 is a graph for showing a total of absolute values of the numbers of turns of the three-phase output windings 21 to 23 in the case of setting "electrical angle phase difference α=120." The total number of turns of the three-phase output windings 21 to 23 is normalized by the maximum number of turns possible around one tooth.

In FIG. 10, when "α=120°" is satisfied, the windings can be wound a large number of turns around any tooth 41. It is thereby possible to reduce an influence by noise and more accurately detect the rotation angle θ of the rotor 30.

As described above, the resolver 20 is made up of the two-phase excitation windings 24 and 25, and the three-phase output windings 21 to 23 having a phase difference of an electrical angle α, so that the rotation angle θ of the rotor 30 can be detected in the same manner as at normal time even when abnormality such as disconnection or a short circuit occurs in any one of these five-phase windings.

As described above, according to the first embodiment, when one spatial order cycle of the output winding is an electrical angle of 360°, a phase difference between the first output winding and the second output winding, and a phase difference between the second output winding and the third output winding are set at an electrical angle α, and "α≠180°×n (n is an integer)" is satisfied.

Thus, it is possible to detect the rotation angle of the rotor in the same manner as at normal time even when abnormality such as disconnection or a short circuit occurs, and to reduce the number of terminals.

Further, the electrical angle phase difference α between the first output winding and the second output winding, and between the second output winding and the third output winding satisfies "30°+180°×n≤α≤150°+180°×n (n is an integer)."

Thus, it is possible to prevent variations in total number of turns of the first, second, and third output windings around each tooth, and to improve the detection accuracy in rotation angle.

Further, it is preferred that the electrical angle phase difference α between the first output winding and the second output winding, and between the second output winding and the third output winding satisfy "50°+180°×n≤α≤130°+180°×n (n is an integer)."

Thus, it is possible to prevent variations in total number of turns of the first, second, and third output windings around each tooth, and to improve the detection accuracy in rotation angle.

Further, it is more preferred that the electrical angle phase difference α between the first output winding and the second output winding, and between the second output winding and the third output winding satisfy "α=60°±5°+180°×n (n is an integer)" or "α=120°±5°+180°×n (n is an integer)."

Thus, it is possible to prevent variations in total number of turns of the first, second, and third output windings around each tooth, and to improve the detection accuracy in rotation angle.

Second Embodiment

Figure 11:
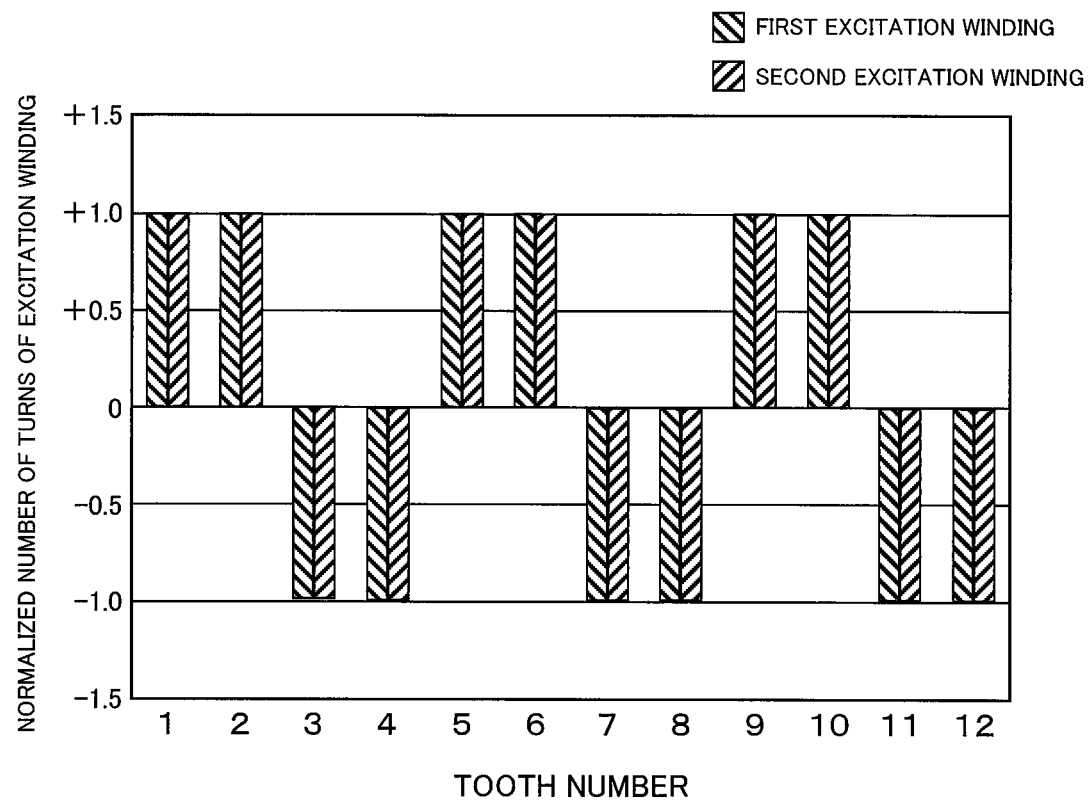
FIG. 11 is an explanatory graph for showing a relationship between the numbers of turns of the first and second excitation windings and each tooth number in a resolver of a rotation angle detector according to a second embodiment of the present invention.

FIG. 11 is an explanatory graph for showing the relationship between the numbers of turns of first and second excitation windings and each tooth number in a resolver of a rotation angle detector according to a second embodiment of the present invention. FIG. 11 is a graph for showing a winding distribution of the excitation windings. The number of turns of the excitation winding is normalized by the amplitude of the number of turns.

The resolver in the second embodiment of the present invention has a similar configuration to that of the resolver 20 illustrated in FIG. 3, the number $N_s$ of teeth 41 of the stator 40 is 12, and the number $N_x$ of salient poles 31 of the rotor 30 is 5. A description is given in the second embodiment of the present invention assuming that the number $N_s$ of teeth 41 is 12 and the number $N_x$ of salient poles 31 is κ, but the numbers are not limited to the above, and a similar effect can be obtained with numbers other than these numbers.

In FIG. 11, a winding direction (+) and a winding direction (−) are defined in the excitation winding of the resolver 20. When the direction of the winding of some coil is expressed as a winding direction (+), a coil with its winding wound reversely is expressed as a winding direction (−). Further, absolute values of the number of turns in the winding direction (+) and the number of turns in the winding direction (−) are the same. That is, when the number of turns in the winding direction (+) is +X, the number of turns in the winding direction (−) is −X.

In the second embodiment of the present invention, the excitation winding is repeatedly wound around the stator, by units of four teeth of (+), (+), (−), and (−), $N_e$ times. At this time, the number $N_e$ of pole pairs in any of the first excitation winding 24 and the second excitation winding 25 is 3 (=$N_s/4$).

Figure 12:
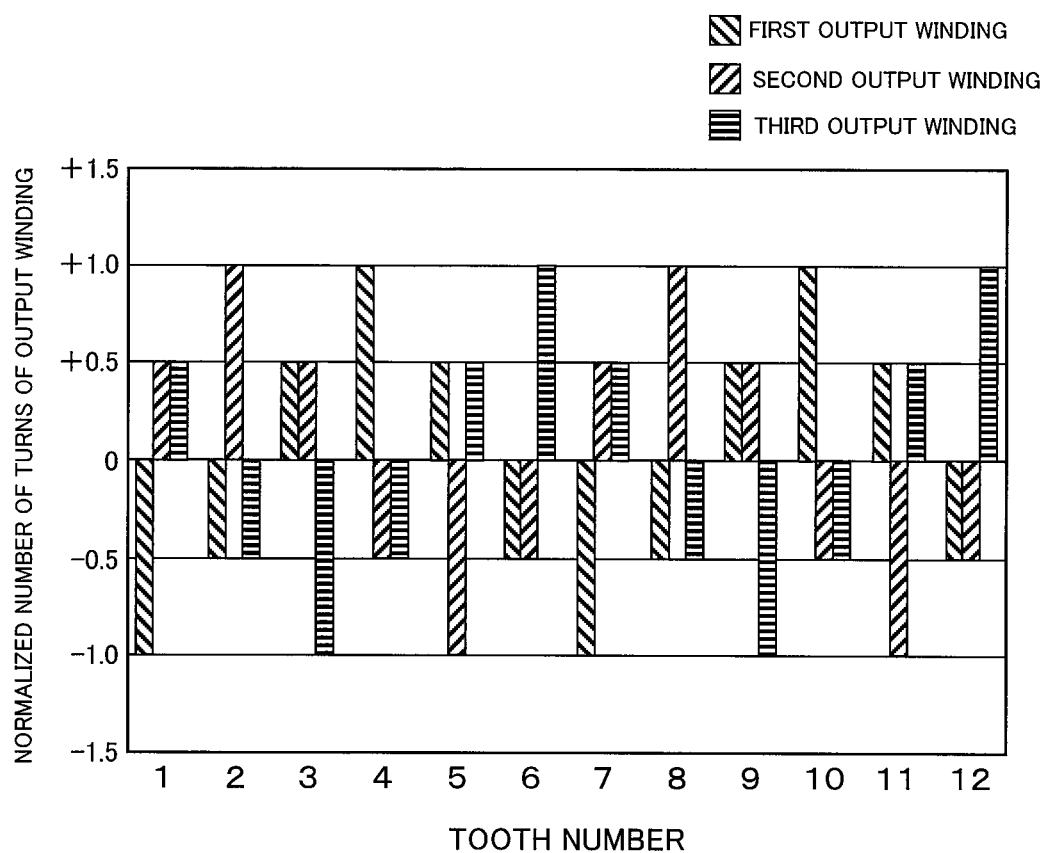
FIG. 12 is an explanatory graph for showing a relationship between the numbers of turns of the first, second, and third output windings and each tooth number in the resolver of the rotation angle detector according to the second embodiment of the present invention.

FIG. 12 is an explanatory graph for showing the relationship between the numbers of turns of the first, second, and third output windings and each tooth number in the resolver of the rotation angle detector according to the second embodiment of the present invention. FIG. 12 is a graph for showing a winding distribution of the output windings. The number of turns of the output winding is normalized by the amplitude of the number of turns.

In FIG. 12, three-phase (A-phase, B-phase, C-phase) output windings are wound around the tooth 41 of the stator 40. Here, the numbers of turns ($N_{Sai}$, $N_{Sbi}$, $N_{Sci}$) of the output windings (A-phase, B-phase, C-phase) around the i-th tooth 41 are expressed by Expression (1) described above.

In the second embodiment of the present invention, the number $N_e$ of pole pairs of the excitation winding is 3, and the number $N_x$ of salient poles 31 of the rotor 30 is 5, and hence magnetomotive force is a spatial third order and permeance in the gap is a fifth order. Thus, a spatial order of the magnetic flux density of the gap is |3±5|, which is obtained from an expression for a sum of the products of the trigonometric functions.

That is, in the resolver 20 in the second embodiment of the present invention, the spatial order of the magnetic flux density of the gap which is required for the angle detection is "|3±5|=eight order, second order", and here, the rotation angle of the rotor 30 is detected with the spatial order of the output winding taken as the second order.

According to the second embodiment of the present invention, the resolver 20 includes two-phase excitation windings having the same amplitude and configuration, so that the resolver 20 can be excited even when abnormality such as disconnection or a short circuit occurs in any one of the first excitation winding 24 and the second excitation winding 25, and the rotation angle of the rotor 30 can thus be detected in the same manner as at normal time.

Third Embodiment

Figure 13:
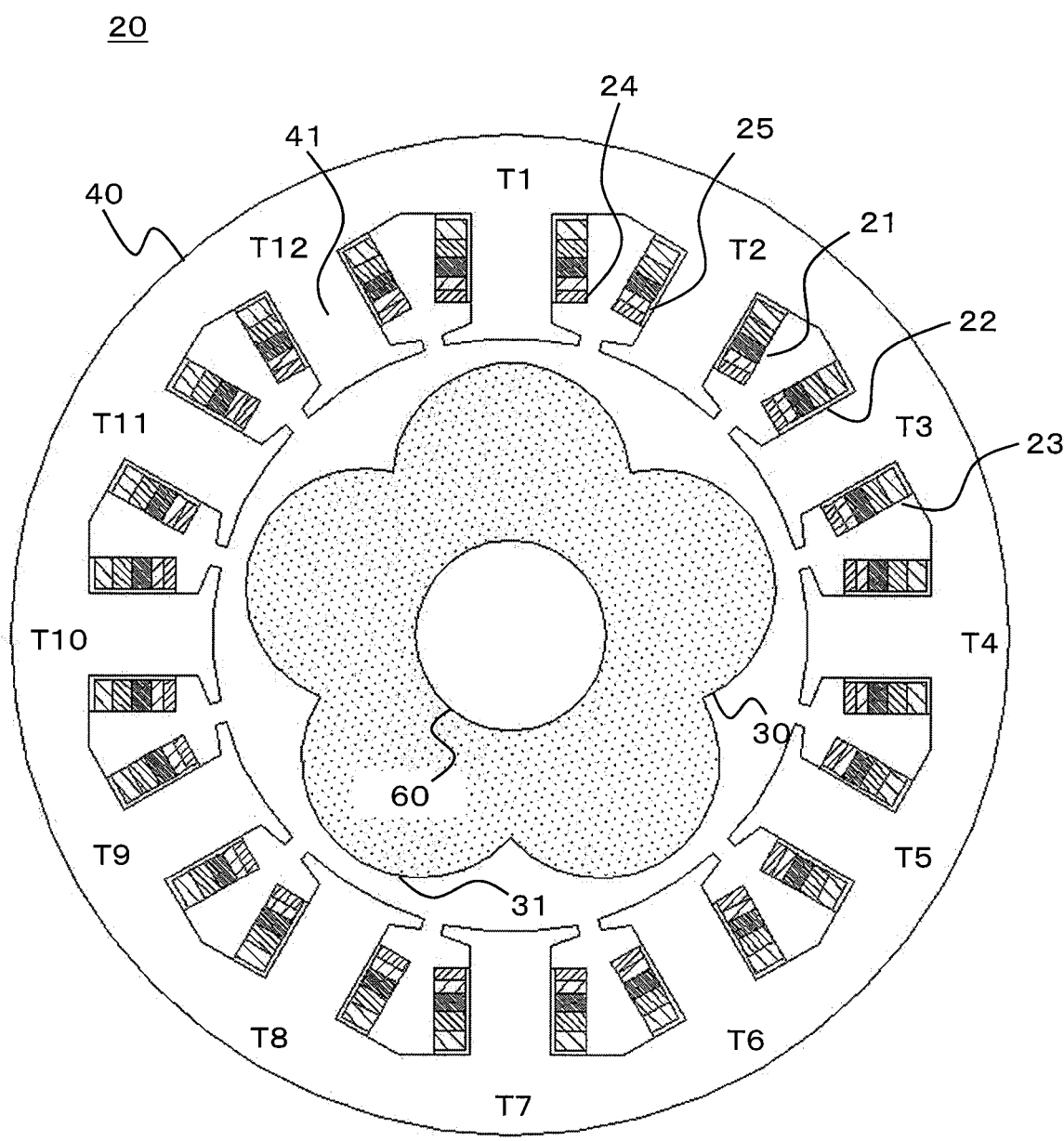
FIG. 13 is a sectional view for illustrating a resolver of a rotation angle detector according to a third embodiment of the present invention.

FIG. 13 is a sectional view for illustrating a resolver of a rotation angle detector according to a third embodiment of the present invention. In FIG. 13, the two-phase excitation windings 24 and 25, and the three-phase output windings 21 to 23 are wound around each of teeth T1 to T12 of the stator 40.

Further, the resolver 20 illustrated in FIG. 13 has a configuration in which the two-phase excitation windings 24 and 25 are wound around an inner diameter side of the tooth 41 first, and then the three-phase output windings 21 to 23 are wound around an outer diameter side thereof. At this time, any one of the first excitation winding 24 and the second excitation winding 25 may be wound first, and the first output winding 21, the second output winding 22, and the third output winding 23 may be wound in any sequence. The winding and the tooth 41 are insulated from each other with an insulator made of insulation paper, coating, or the like.

In the third embodiment of the present invention, the entire lengths of the two-phase excitation windings 24 and 25, and the entire lengths of the three-phase output windings 21 to 23 are equal, and hence the electric resistances of the windings are also equal, so that the detection accuracy in rotation angle can be improved.

The two-phase excitation windings 24 and 25 are wound around the inner diameter side of the tooth 41 and the three-phase output windings 21 to 23 are wound around the outer diameter side of the tooth 41 according to the third embodiment, but the two-phase excitation windings 24 and 25, and the three-phase output windings 21 to 23 are not limited thereto. A similar effect can be obtained even when the three-phase output windings 21 to 23 are wound around the inner diameter side of the tooth 41 and the two-phase excitation windings 24 and 25 are wound around the outer diameter side of the tooth 41.

Fourth Embodiment

Figure 14:
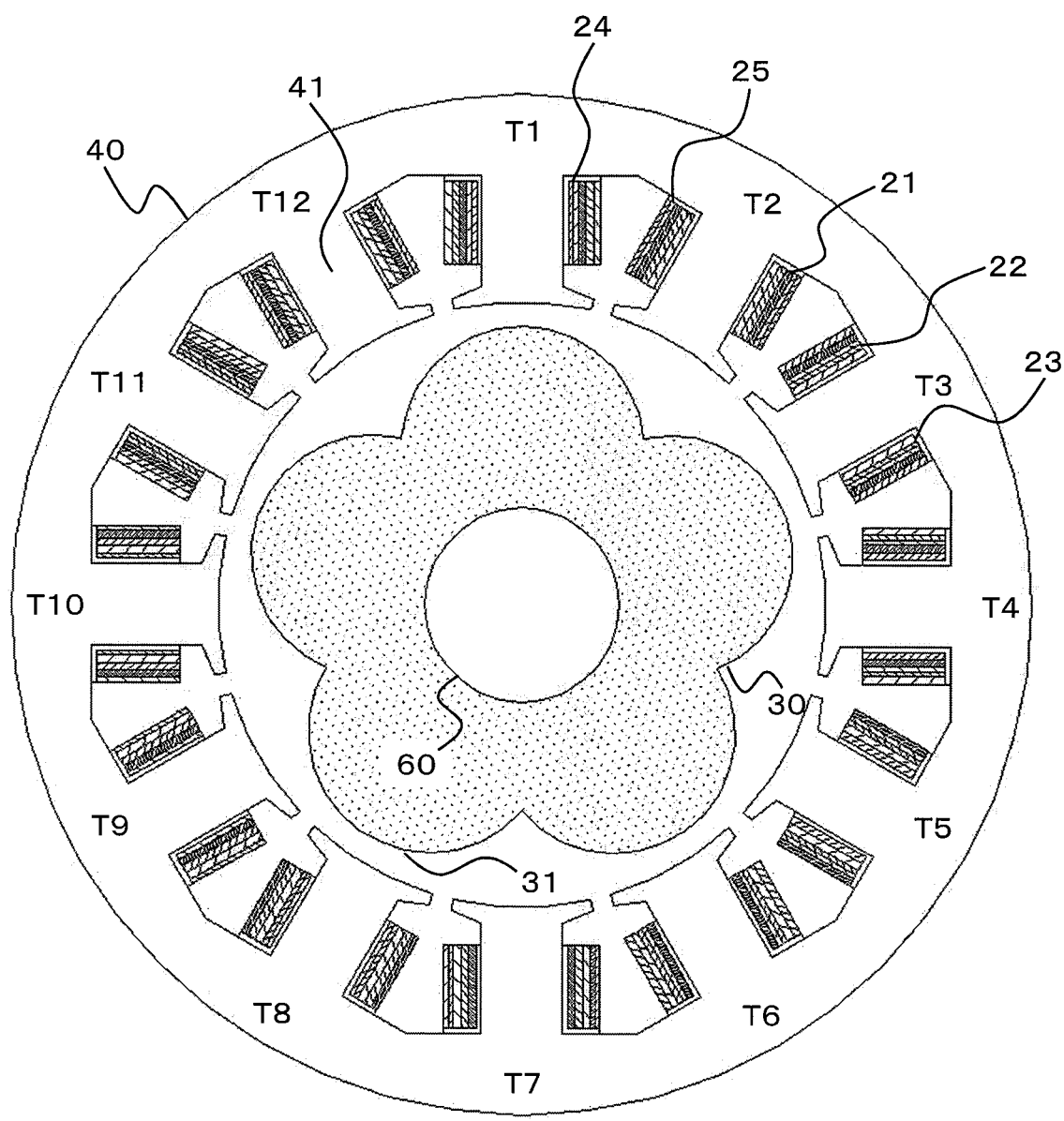
FIG. 14 is a sectional view for illustrating a resolver of a rotation angle detector according to a fourth embodiment of the present invention.

FIG. 14 is a sectional view for illustrating a resolver of a rotation angle detector according to a fourth embodiment of the present invention. In FIG. 14, the two-phase excitation windings 24 and 25, and the three-phase output windings 21 to 23 are wound around each of teeth T1 to T12 of the stator 40.

Specifically, the first excitation winding 24, the second excitation winding 25, the first output winding 21, the second output winding 22, and the third output winding 23 are wound around a tooth T1 in the sequence close to the tooth 41. In addition, the third output winding 23, the second output winding 22, the first output winding 21, the second excitation winding 25, and the first excitation winding 24 are wound around a tooth T2 in the sequence close to the tooth 41.

Further, the third output winding 23, the first excitation winding 24, the second excitation winding 25, the first output winding 21, and the second output winding 22 are wound around a tooth T3 in the sequence close to the tooth 41. In addition, the second output winding 22, the first output winding 21, the second excitation winding 25, the first excitation winding 24, and the third output winding 23 are wound around a tooth T4 in the sequence close to the tooth 41.

Further, the second output winding 22, the third output winding 23, the first excitation winding 24, the second excitation winding 25, and the first output winding 21 are wound around a tooth T5 in the sequence close to the tooth 41. In addition, the first output winding 21, the second excitation winding 25, the first excitation winding 24, the third output winding 23, and the second output winding 22 are wound around a tooth T6 in the sequence close to the tooth 41.

Further, the first output winding 21, the second output winding 22, the third output winding 23, the first excitation winding 24, and the second excitation winding 25 are wound around a tooth T7 in the sequence close to the tooth 41. In addition, the second excitation winding 25, the first excitation winding 24, the third output winding 23, the second output winding 22, and the first output winding 21 are wound around a tooth T8 in the sequence close to the tooth 41.

Further, the second excitation winding 25, the first output winding 21, the second output winding 22, the third output winding 23, and the first excitation winding 24 are wound around a tooth T9 in the sequence close to the tooth 41. In addition, the first excitation winding 24, the third output winding 23, the second output winding 22, the first output winding 21, and the second excitation winding 25 are wound around a tooth T10 in the sequence close to the tooth 41.

Further, the first excitation winding 24, the second excitation winding 25, the first output winding 21, the second output winding 22, and the third output winding 23 are wound around a tooth T11 in the sequence close to the tooth 41. In addition, the third output winding 23, the second output winding 22, the first output winding 21, the second excitation winding 25, and the first excitation winding 24 are wound around a tooth T12 in the sequence close to the tooth 41.

In the fourth embodiment of the present invention, with the three-phase output windings 21 to 23 circumferentially arranged and wound, the respective distances from the gap between the stator 40 and the rotor 30 to the first output winding 21, the second output winding 22, and the third output winding 23 are equal to each other. Thus, magnetic fluxes interlinked to the respective output windings are equal, that is, amplitudes of output signals are equal, thereby enabling improvement in detection accuracy.

FIG. 15 is an explanatory table for showing the relationship between a sequence to wind the windings and each tooth number in the resolver of the rotation angle detector according to the fourth embodiment of the present invention. FIG. 15 is a table for showing the sequence to wind the two-phase excitation windings 24 and 25, and the three-phase output windings 21 to 23 around the teeth Ti to T12 of the stator 40. In FIG. 15, the sequence to wind the windings around the teeth Ti to T12 of the stator 40 is a sequence of 1, 2, 3, 4, 5 from the tooth closest to the tooth 41.

According to the fourth embodiment of the present invention, through variation of the sequence to wind the windings around each teeth, the entire lengths of the two-phase excitation windings 24 and 25, and the entire lengths of the three-phase output windings 21 to 23 are equal, and hence the electric resistances of the windings are also equal, so that the detection accuracy in rotation angle can further be improved.

In the fourth embodiment, the sequence to wind the windings is not limited to the above, and a similar effect can be obtained by varying the sequence to wind the windings around each tooth such that the entire lengths of the two-phase excitation windings 24 and 25, and the entire lengths of the three-phase output windings 21 to 23 are equal, that is, a total of the sequence to wind each winding is the same.

Fifth Embodiment

Figure 16:
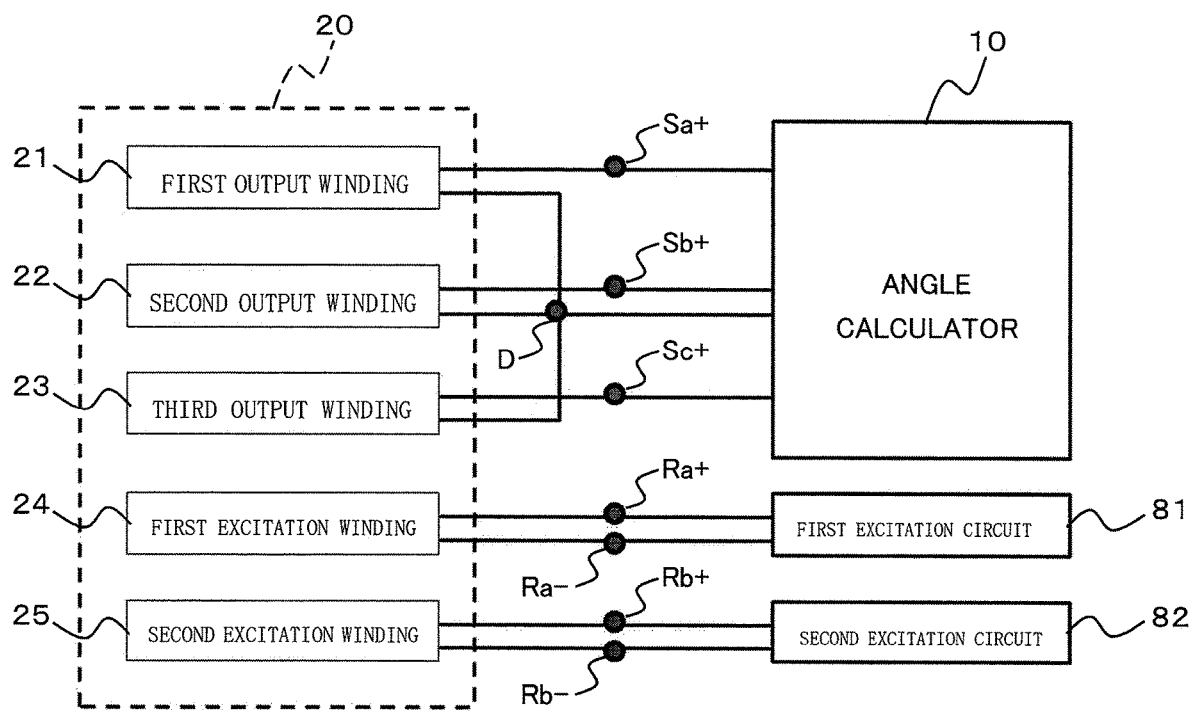
FIG. 16 is a block diagram for illustrating a rotation angle detector according to a fifth embodiment of the present invention.
Figure 17:
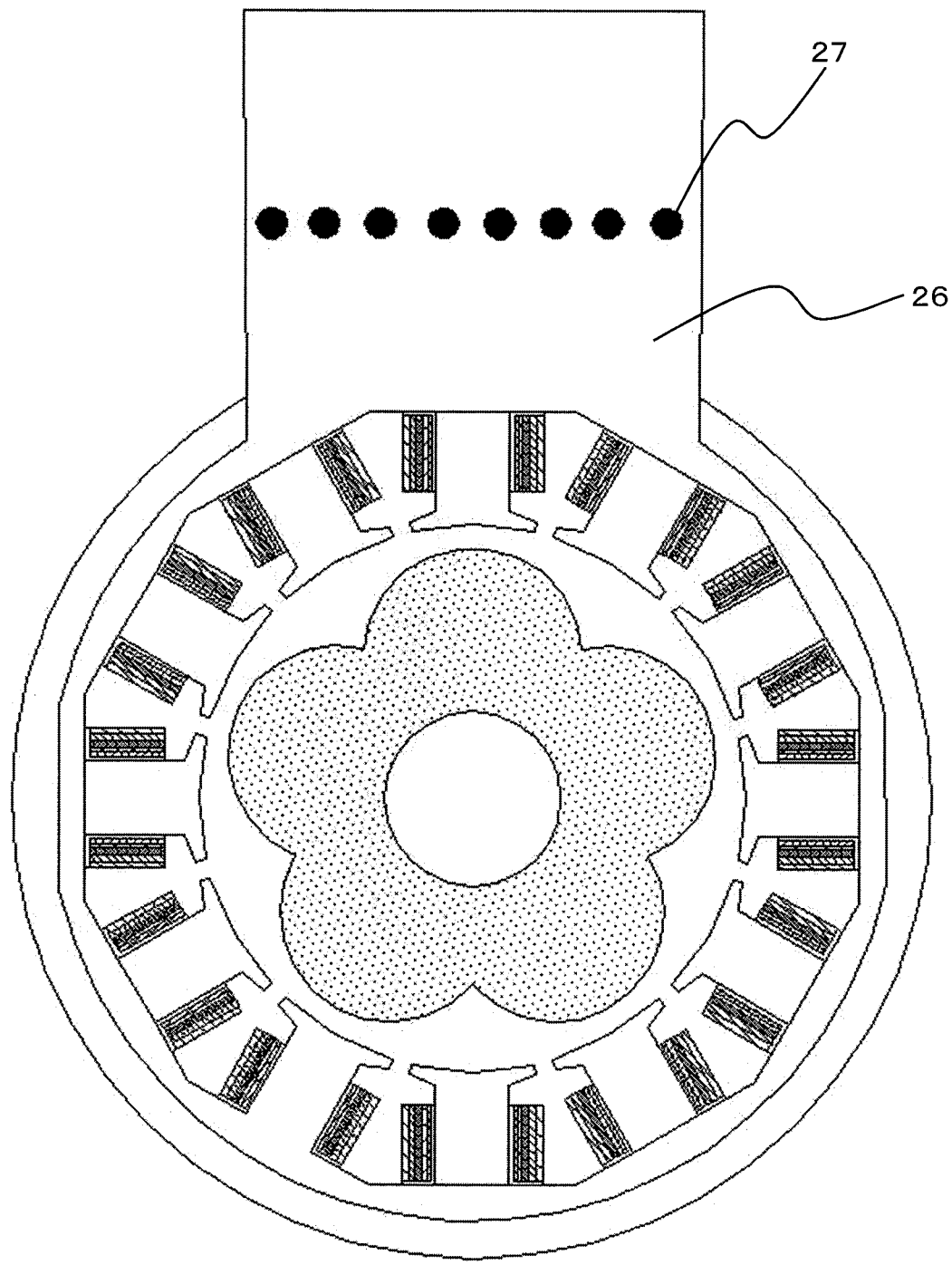
FIG. 17 is a front view for illustrating a resolver of the rotation angle detector according to the fifth embodiment of the present invention.

FIG. 16 is a block diagram for illustrating a rotation angle detector according to a fifth embodiment of the present invention. FIG. 17 is a front view for illustrating a resolver of the rotation angle detector according to the fifth embodiment of the present invention.

In FIG. 16 and FIG. 17, the coil 50 is wound around the tooth 41 of the stator 40, the coil 50 being made up of the two-phase excitation windings 24 and 25, and the three-phase output windings 21 to 23 having a phase difference of an electrical angle of 120°. Further, eight terminals 27 are provided in the extended part 26 of the resolver 20 and are electrically connected to the excitation windings and the output windings wound around the tooth 41.

Here, the terminals 27 electrically connected to both ends of the first excitation winding 24 and the second excitation winding 25 are respectively referred to as a positive terminal Ra+ of the first excitation winding 24, a negative terminal Ra− of the first excitation winding 24, a positive terminal Rb+ of the second excitation winding 25, and a negative terminal Rb− of the second excitation winding 25.

The first excitation winding 24 is electrically connected to the first excitation circuit 81 via the positive terminal Ra+ and the negative terminal Ra−. The second excitation winding 25 is electrically connected to the second excitation circuit 82 via the positive terminal Ra+ and the negative terminal Ra−. The first excitation circuit 81 and the second excitation circuit 82 apply AC voltages to the first excitation winding 24 and the second excitation winding 25, respectively.

One end of each of the first output winding 21, the second output winding 22, and the third output winding 23 is electrically connected to construct a neutral point, and the terminal 27 electrically connected to this neutral point is referred to as a neutral point terminal D. Further, the terminals 27, each of which another end of each of the first output winding 21, the second output winding 22, and the third output winding 23 is electrically connected, are respectively referred to as a positive terminal Sa+ of the first output winding 21, a positive terminal Sb+ of the second output winding 22, and a positive terminal Sc+ of the third output winding 23.

The first output winding 21, the second output winding 22, and the third output winding 23 are electrically connected to the angle calculator 10 via the neutral point D and the positive terminals Sa+, Sb+, and Sc+. The angle calculator 10 calculates a rotation angle θ of the rotor 30 from output voltages generated in the three-phase output windings 21 to 23, and outputs the calculated rotation angle θ.

When two resolvers are used for redundancy or when two-system windings made up of an excitation winding and two-phase output windings are wound around one resolver, the number of terminals is 12, whereas the number of terminals can be set to eight in the fifth embodiment of the present invention. Thus, it is possible to facilitate wiring between the terminal 27 and the angle calculator 10 and achieve downsizing.

Figure 18:
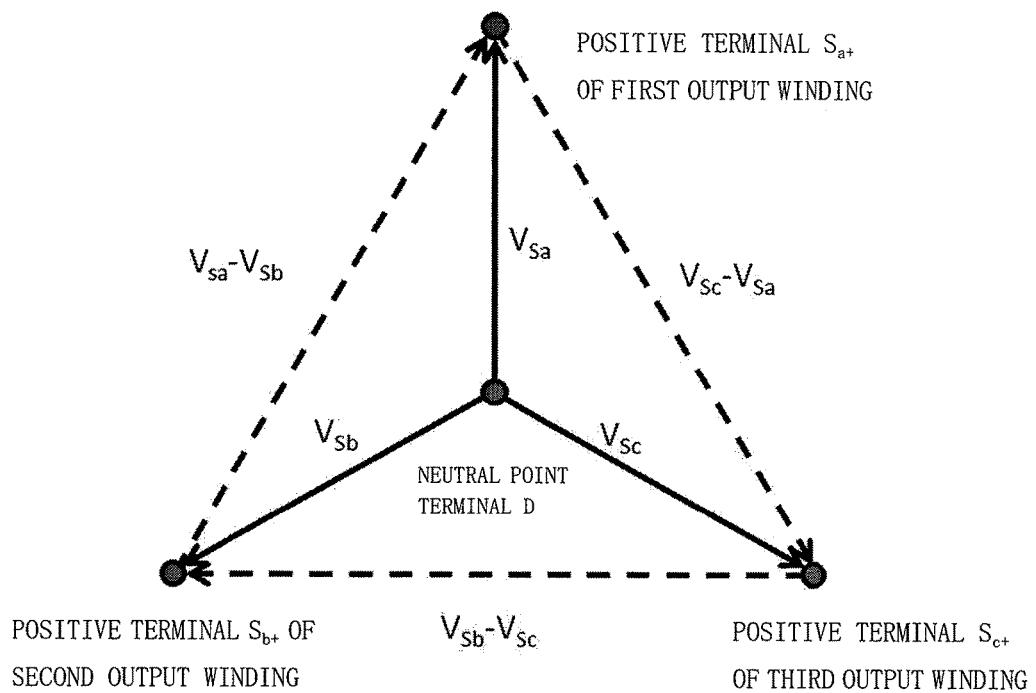
FIG. 18 is a vector diagram for illustrating output voltages of the three-phase output windings in the resolver of the rotation angle detector according to the fifth embodiment of the present invention.

FIG. 18 is a vector diagram for illustrating output voltages of the three-phase output windings in the resolver of the rotation angle detector according to the fifth embodiment of the present invention. In FIG. 18, the terminals are illustrated for the sake of convenience. In FIG. 18, in the resolver 20 in the fifth embodiment of the present invention, the three-phase output windings 21 to 23 have a phase difference of the electrical angle of 120°, so that Expression (8) below holds when the output voltages generated by these three-phase output windings 21 to 23 are $V_{Sa}$, $V_{Sb}$, and $V_{Sc}$.

$$V_{Sa}+V_{Sb}+V_{Sc}=0 \quad \text{Mathematical Expression (8)}$$

In the fifth embodiment of the present invention, the output voltage $V_{Sa}$ of the first output winding 21 can be detected from the neutral point terminal D and the positive terminal Sa+ of the first output winding 21. The output voltage $V_{Sb}$ of the second output winding 22 can be detected from the neutral point terminal D and the positive terminal Sb+ of the second output winding 22. The output voltage $V_{Sc}$ of the third output winding 23 can be detected from the neutral point terminal D and the positive terminal Sc+ of the third output winding 23.

Further, $V_{Sa}-V_{Sb}$ can be detected from the positive terminal Sa+ of the first output winding 21 and the positive terminal Sb+ of the second output winding 22. $V_{Sb}-V_{Sc}$ can be detected from the positive terminal Sb+ of the second output winding 22 and the positive terminal Sc+ of the third output winding 23. $V_{Sc}-V_{Sa}$ can be detected from the positive terminal Sc+ of the third output winding 23 and the positive terminal Sa+ of the first output winding 21.

$V_{Sa}$, $V_{Sb}$, and $V_{Sc}$ here are expressed by Expressions (2) to (4) above. In the resolver 20 in the fifth embodiment of the present invention, the three-phase output windings 21 to 23 each have the phase difference α of the electrical angle of 120°, and hence $V_{Sb}-V_{Sc}$, $V_{Sc}-V_{Sa}$, and $V_{Sa}-V_{Sb}$ are expressed by Expressions (9) to (11) below.

$$V_{Sc}-V_{Sa}=\sqrt{3}k\cdot E\ \sin(N_x\cdot\theta-90°) \quad \text{Mathematical Expression (9)}$$

$$V_{Sc}-V_{Sa}=\sqrt{3}k\cdot E\ \sin(N_x\cdot\theta-90°) \quad \text{Mathematical Expression (10)}$$

$$V_{Sa}-V_{Sb}=\sqrt{3}k\cdot E\ \sin(N_x\cdot\theta+150°) \quad \text{Mathematical Expression (11)}$$

As described above, in the fifth embodiment of the present invention, the output voltages of the three-phase output windings 21 to 23 can each be detected by selecting two output terminals.

Figure 19:
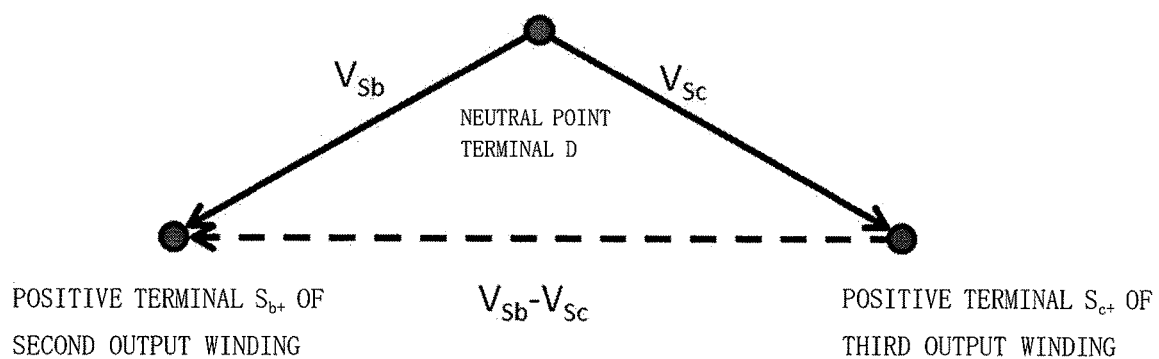
FIG. 19 is a vector diagram for illustrating output voltages of the output windings in a case where a positive terminal of a first output winding is disconnected in the resolver of the rotation angle detector according to the fifth embodiment of the present invention.

FIG. 19 is a vector diagram for illustrating the output voltages of the output windings in a case where the positive terminal of the first output winding is disconnected in the resolver of the rotation angle detector according to the fifth embodiment of the present invention. In FIG. 19, there is illustrated a voltage vector diagram at the time when disconnection occurs between the angle calculator 10 and the positive terminal Sa+ of the first output winding 21 out of the three-phase output windings 21 to 23.

In FIG. 19, when the disconnection occurs between the positive terminal Sa+ of the first output winding 21 and the angle calculator 10, the output voltage from the positive terminal Sa+ of the first output winding 21 cannot be detected, but the output voltage $V_{Sb}$ of the second output winding 22 can be detected from the neutral point terminal D and the positive terminal Sb+ of the second output winding 22.

The output voltage $V_{Sc}$ of the third output winding 23 can be detected from the neutral point terminal D and the positive terminal Sc+ of the third output winding 23. $V_{Sb}-V_{Sc}$ can be detected from the positive terminal Sb+ of the second output winding 22 and the positive terminal Sc+ of the third output winding 23. Thus, the rotation angle θ of the rotor 30 can be detected in the same manner as at normal time by Expressions (5) to (7) above.

FIG. 20 is an explanatory table for showing combination of output voltages required for calculation of a rotation angle of a rotor in the resolver of the rotation angle detector according to the fifth embodiment of the present invention. FIG. 20 is a table for showing combination of output voltages that are required for the calculation of the rotation angle θ of the rotor 30 when any one of the positive terminals Sa+, Sb+, and Sc+ of the three-phase output windings 21 to 23, and the neutral point terminal D is disconnected.

In FIG. 20, when the positive terminals Sa+, Sb+, and Sc+ of the three-phase output windings 21 to 23, and the neutral point terminal D are disconnected, there are three methods for calculating the rotation angle θ of the rotor 30 with respect to each of the terminals. Thus, there is a total of twelve methods for calculating the rotation angle θ of the rotor 30.

In the fifth embodiment of the present invention, two-phase excitation windings having the same amplitude and configuration are provided, so that the resolver 20 is excited even when disconnection occurs in any one of the excitation windings, and the rotation angle θ of the rotor 30 can be calculated in the same manner as at normal time.

Further, the three-phase output windings 21 to 23 are disposed, with a phase difference between each thereof set at the electrical angle of 120°, and one end of each of these windings is electrically connected to construct the neutral point, and this neutral point terminal D and the positive terminals Sa+, Sb+, and Sc+ of the three-phase output windings 21 to 23 are connected to the angle calculator 10. Thus, there is a total of twelve methods for calculating the rotation angle θ of the rotor 30, and even when disconnection occurs in the output winding, the rotation angle θ of the rotor 30 can be detected in the same manner as at normal time.

FIG. 21 is an explanatory table for showing short circuits that can occur between terminals provided in the extended part of the resolver of the rotation angle detector according to the fifth embodiment of the present invention. In FIG. 21, a short-circuit case number is provided to each short-circuit case for the sake of convenience. In FIG. 21, there can be found that there are twenty one short-circuit cases in total.

The case of a short circuit between a positive terminal of an arbitrary one-phase output winding and another arbitrary terminal is equivalent among the three-phase output windings 21 to 23, and hence, here the positive terminal Sa+ of the first output winding 21 and the positive terminal Sb+ of the second output winding 22 are shown while the positive terminal Sc+ of the third output winding 23 is omitted.

FIG. 22 is a table for showing angle errors in the case of calculating the rotation angle θ of the rotor 30 by the twelve methods shown in FIG. 20 at normal time and in twenty one short-circuit cases. FIG. 22 is an explanatory table for showing angle errors at the time of calculating the rotation angle of the rotor by the twelve methods in a case where a short circuit occurs between the terminals in the resolver of the rotation angle detector according to the fifth embodiment of the present invention.

In FIG. 22, an angle error δ is expressed by Expression (12) below, assuming that the rotation angle of the rotor 30 calculated from an output voltage by the angle calculator 10 is $\theta_{resolver}$, and the rotation angle of the real rotor 30 is θ.

$$\delta = \theta_{resolver} - \theta \quad \text{Mathematical Expression (12)}$$

The angle error δ pulsates in accordance with the rotation angle θ of the real rotor 30, in FIG. 22, each amplitude is normalized by a value obtained from $V_{Sb}$ and $V_{Sc}$ at normal time without a short circuit, namely, 1.0.

According to the fifth embodiment of the present invention, even when a short circuit occurs among eight terminals provided in the extended part 26 of the resolver 20, it is possible to calculate the rotation angle θ of the rotor 30 in the same manner as at normal time.

Sixth Embodiment

In the fifth embodiment, in FIG. 22, there have shown angle errors at the time of calculating the rotation angle θ of the rotor 30 by the twelve methods in the total of twenty one short-circuit cases which are considered possible to occur among the eight terminals provided in the extended part 26 of the resolver 20. According to FIG. 22, angle errors calculated by three methods are the same both at normal time and the time of occurrence of short circuit, and there are thus four values as the angle errors.

That is, even when the first output winding 21 is disconnected, three rotation angles θ of the rotor 30 are equal, the angles θ being calculated based on the output voltage $V_{Sb}$ of the second output winding 22 detectable from the neutral point terminal D and the positive terminal Sb+ of the second output winding 22, the output voltage $V_{Sc}$ of the third output winding 23 detectable from the neutral point terminal D and the positive terminal Sc+ of the third output winding 23, or $V_{Sb}-V_{Sc}$ detectable from the positive terminal Sb+ of the second output winding 22 and the positive terminal Sc+ of the third output winding 23, from which the rotation angle θ of the rotor 30 can be calculated.

Similarly, even when the second output winding 22 is disconnected, three rotation angles θ of the rotor 30 are equal, the angles θ being calculated based on the output voltage $V_{Sa}$ of the first output winding 21 detectable from the neutral point terminal D and the positive terminal Sa+ of the first output winding 21, the output voltage Vs, of the third output winding 23 detectable from the neutral point terminal D and the positive terminal Sc+ of the third output winding 23, or $V_{Sc}-V_{Sa}$ detectable from the positive terminal Sc+ of the third output winding 23 and the positive terminal Sa+ of the first output winding 21, from which the rotation angle θ of the rotor 30 can be calculated.

Similarly, even when the third output winding 23 is disconnected, three rotation angles θ of the rotor 30 are equal, the angles θ being calculated based on the output voltage $V_{Sa}$ of the first output winding 21 detectable from the neutral point terminal D and the positive terminal Sa+ of the first output winding 21, the output voltage $V_{Sb}$ of the second output winding 22 detectable from the neutral point terminal D and the positive terminal Sb+ of the second output winding 22, or $V_{Sa}-V_{Sb}$ detectable from the positive terminal Sa+ of the first output winding 21 and the positive terminal Sb+ of the second output winding 22, from which the rotation angle θ of the rotor 30 can be calculated.

Similarly, even when the neutral point terminal D is disconnected, three rotation angles θ of the rotor 30 are equal, the angles θ being calculated based on $V_{Sa}-V_{Sb}$ detectable from the positive terminal Sa+ of the first output winding 21 and the positive terminal Sb+ of the second output winding 22, $V_{Sb}-V_{Sc}$ detectable from the positive terminal Sb+ of the second output winding 22 and the positive terminal Sc+ of the third output winding 23, or $V_{Sc}-V_{Sa}$ detectable from the positive terminal Sc+ of the third output winding 23 and the positive terminal Sa+ of the first output winding 21, from which the rotation angle θ of the rotor 30 can be calculated.

When the minimum value of the angle error in each short-circuit case is compared, the minimum value is 0.7 in all of the short-circuit cases 1 to 18, while the minimum value is equal to 200 or more in any of the short-circuit cases 19 to 21. That is, when a short circuit occurs between two arbitrary terminals out of the positive terminals Sa+, Sb+, and Sc+ of the three-phase output windings 21 to 23 and the neutral point terminal D, the angle error is significantly large.

Figure 23:
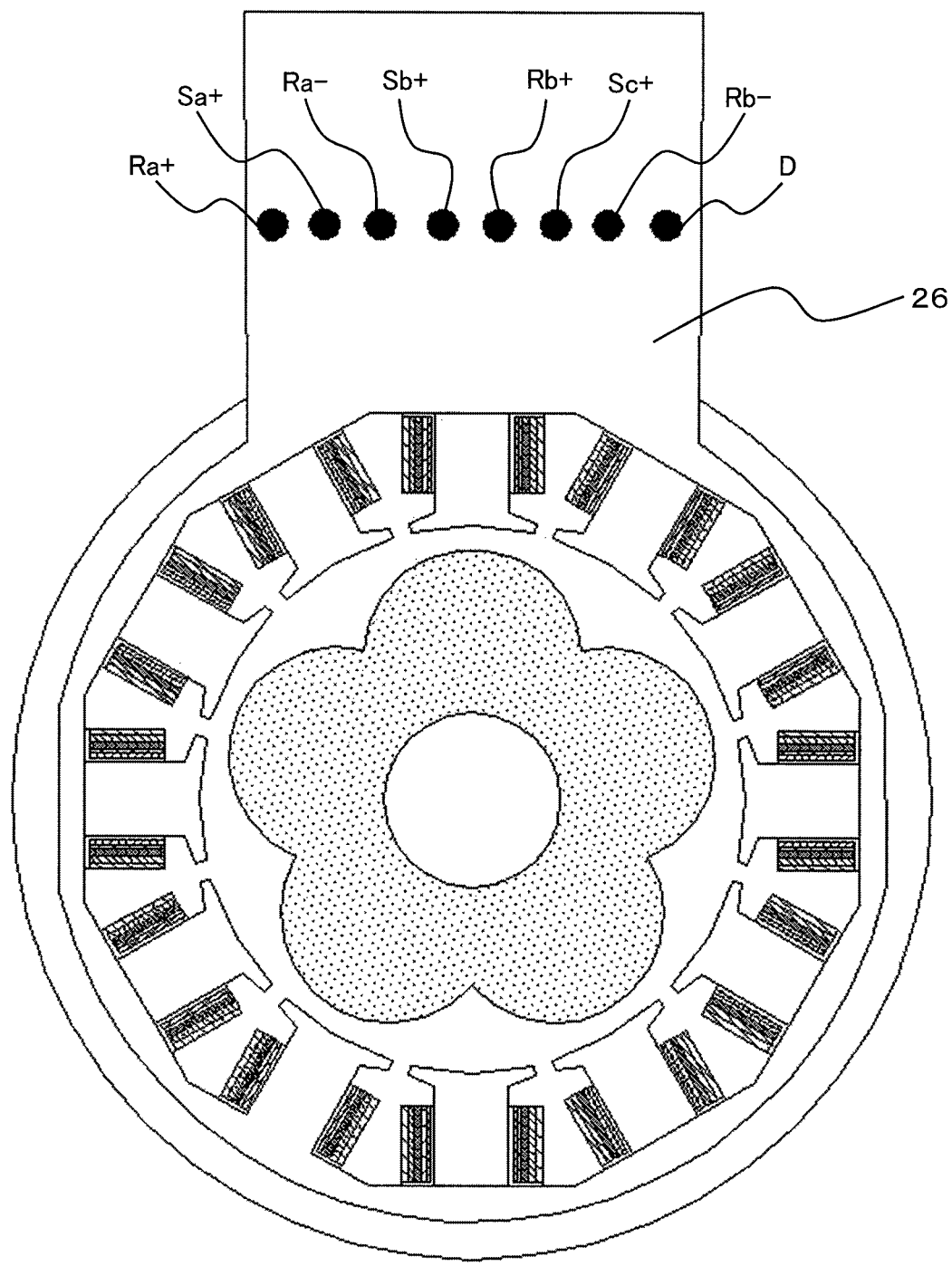
FIG. 23 is a front view for illustrating a resolver of a rotation angle detector according to a sixth embodiment of the present invention.

FIG. 23 is a front view for illustrating a resolver of a rotation angle detector according to a sixth embodiment of the present invention. In FIG. 23, in the extended part 26 of the resolver 20, eight terminals, which are the positive terminal Ra+ of the first excitation winding 24, the positive terminal Sa+ of the first output winding 21, the negative terminal Ra− of the first excitation winding 24, the positive terminal Sb+ of the second output winding 22, the positive terminal Rb+ of the second excitation winding 25, the positive terminal Sc+ of the third output winding 23, the negative terminal Rb− of the second excitation winding 25, and the neutral point terminal D, are provided in this sequence from left.

According to the sixth embodiment of the present invention, it is possible to prevent occurrence of a short circuit between two arbitrary terminals out of the terminals of the output windings, that is, the positive terminals Sa+, Sb+, and Sc+ of the three-phase output windings 21 to 23 and the neutral point terminal D. Thus, even when a short circuit occurs between two adjacent terminals provided in the extended part 26 of the resolver 20, it is possible to calculate the rotation angle θ of the rotor 30 with the equal accuracy to that at normal time.

In the sixth embodiment, the sequence in which the terminals are disposed is not limited to the above, and a similar effect can be obtained as long as the terminals are disposed such that the positive terminals Sa+, Sb+, and Sc+ of the three-phase output windings 21 to 23 and the neutral point terminal D are not adjacent to one another.

The invention claimed is:
1. A rotation angle detector, comprising:
   a rotor, which includes $N_x$ salient poles;
   a stator, including teeth Ti to Tm circumferentially arranged, where "m" is a natural number;
   a first excitation winding Rai (i=1 to m), which is mounted on an i-th tooth Ti of the stator;
   a second excitation winding Rbi (i=1 to m), which is mounted on the i-th tooth Ti of the stator;
   a first output winding Sai (i=1 to m), which is mounted on the i-th tooth Ti of the stator;
   a second output winding Sbi (i=1 to m), which is mounted on the i-th tooth Ti of the stator;
   a third output winding Sci (i=1 to m), which is mounted on the i-th tooth Ti of the stator;
   a first excitation circuit and a second excitation circuit, which are configured to apply AC voltages to the first excitation winding Ra1 to Ram and the second excitation windings Rb1 to Rbm, which are connected in series, respectively; and an angle calculator, which is configured to calculate a rotation angle of the rotor from output voltages of the first output windings Sa1 to Sam, the second output windings Sb1 to Sbm, and the third output windings Sc1 to Scm, wherein, when one spatial order cycle of the output winding is defined as an electrical angle of 360°, a phase difference of an electrical angle $\alpha$ is provided between the first output winding and the second output winding, and between the second output winding and the third output winding, respectively, and $\alpha \neq 180° \times n$ is satisfied (n is an integer), and wherein the first output winding, the second output winding, and the third output winding are electrically separated from each other and are separately connected to the angle calculator.

2. A rotation angle detector according to claim 1, wherein each of the electrical angle phase differences a between the first output winding and the second output winding, and between the second output winding and the third output winding satisfies "$30°+180° \times n \leq \alpha \leq 150°+180° \times n$ (n is an integer)".

3. A rotation angle detector according to claim 1, wherein each of the electrical angle phase differences a between the first output winding and the second output winding, and between the second output winding and the third output winding satisfies "$50°+180° \times n \leq \alpha \leq 130°+180° \times n$ (n is an integer)".

4. A rotation angle detector according to claim 1, wherein each of the electrical angle phase differences a between the first output winding and the second output winding, and between the second output winding and the third output winding satisfies "$\alpha=60° \pm 5°+180° \times n$ (n is an integer)" or "$\alpha=120° \pm 5°+180° \times n$ (n is an integer)".

5. A rotation angle detector according to claim 4, wherein:
one end of each of the first output winding, the second output winding, and the third output winding is electrically connected to construct a neutral point;
the neutral point and another end of each of the first output winding, the second output winding, and the third output winding are electrically connected to the angle calculator; and
the angle calculator is configured to calculate the rotation angle from two output voltages out of four output voltages obtained from the neutral point and another end of each of the first output winding, the second output winding, and the third output winding.

6. A rotation angle detector according to claim 5, wherein:
the outside of the resolver having the rotor and the stator includes:
four excitation terminals connecting both ends of the first excitation winding and the second excitation winding with the first excitation circuit and the second excitation circuit; and
four output terminals connecting, to the angle calculator, a neutral point formed by electrically connecting one end of each of the first output winding, the second output winding, and the third output winding and another end of each of the first output winding, the second output winding, and the third output winding; and
two or more output terminals are disposed so as to be prevented from being adjacent to each other.

7. A rotation angle detector according to claim 1, wherein the first excitation winding, the second excitation winding, the first output winding, the second output winding, and the third output winding are radially arranged and wound around each of the teeth.

8. A rotation angle detector according to claim 1, wherein the first excitation winding, the second excitation winding, the first output winding, the second output winding, and the third output winding are circumferentially arranged and wound around each of the teeth, and wound around each of the teeth in a difference sequence.

9. A rotary electric machine, to which the rotation angle detector of claim 1 has been applied.

10. A rotation angle detector according to claim 1, wherein positive terminals of each of the first output winding, the second output winding, and the third output winding are directly connected to the angle calculator.

* * * * *